(12) United States Patent
Garg et al.

(10) Patent No.: US 12,140,548 B2
(45) Date of Patent: Nov. 12, 2024

(54) SURFACE-ENHANCED RAMAN SPECTROSCOPY MEMBRANES AND TEXTILES, METHODS OF MAKING, AND USES THEREOF

(71) Applicant: Virginia Tech Intellectual Properties, Inc., Blacksburg, VA (US)

(72) Inventors: Aditya Garg, Blacksburg, VA (US); Wei Zhou, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 150 days.

(21) Appl. No.: 17/677,797

(22) Filed: Feb. 22, 2022

(65) Prior Publication Data

US 2022/0299444 A1 Sep. 22, 2022

Related U.S. Application Data

(60) Provisional application No. 63/151,501, filed on Feb. 19, 2021.

(51) Int. Cl.
    *G01N 21/65* (2006.01)
    *G01J 3/44* (2006.01)

(52) U.S. Cl.
    CPC .............. *G01N 21/658* (2013.01); *G01J 3/44* (2013.01); *G01N 2021/656* (2013.01)

(58) Field of Classification Search
    None
    See application file for complete search history.

(56) References Cited

U.S. PATENT DOCUMENTS

2013/0107250 A1* 5/2013 Wu ....................... G01N 21/658
                                                          356/244
2015/0223738 A1* 8/2015 Walavalkar .......... A61B 5/1459
                                                          600/478

FOREIGN PATENT DOCUMENTS

KR           20210018606 A   *  2/2021

OTHER PUBLICATIONS

Alba, M., et al. "Macroscale plasmonic substrates for highly sensitive surface-enhanced Raman scattering." Angewandte Chemie International Edition 52.25 (2013): 6459-6463 (Year: 2013).*
Chen, Y., et al. "Low-cost and large-scale flexible SERS-cotton fabric as a wipe substrate for surface trace analysis." Applied Surface Science 436 (2018): 111-116 (Year: 2018).*

(Continued)

*Primary Examiner* — Tarifur R Chowdhury
*Assistant Examiner* — Roberto Fabian, Jr.
(74) *Attorney, Agent, or Firm* — Johnson, Marcou, Isaacs & Nix, LLC

(57) ABSTRACT

Methods are provided for making a membrane or textile having a mechanically robust surface-enhanced Raman spectroscopy (SERS) substrate by in a first step adhesively bonding a micropatch array to a substrate, the micropatch array having a plurality of micron-scale pillars, each of the micron-scale pillars in the plurality of micron-scale pillars containing a plurality of plasmonic nanoparticles dispersed within a polymer matrix; and in a subsequent step etching a portion of the polymer matrix to expose at least a portion of the plasmonic nanoparticles at or near a surface of the micron-scale pillars. Membranes and textiles containing the mechanically robust surface-enhanced Raman spectroscopy (SERS) substrates are also provided.

20 Claims, 19 Drawing Sheets

(56) References Cited

OTHER PUBLICATIONS

5. Chen, Yanmin, et al. "Low-cost and large-scale flexible SERS-cotton fabric as a wipe substrate for surface trace analysis." Applied Surface Science 436 (2018): 111-116 (Year: 2018).*

6. Jiang, Jiaolai, et al. "Flexible and adhesive tape decorated with silver nanorods for in-situ analysis of pesticides residues and colorants." Microchimica Acta 186 (2019): 1-8 (Year: 2019).*

* cited by examiner

SURFACE-ENHANCED RAMAN SPECTROSCOPY MEMBRANES AND TEXTILES, METHODS OF MAKING, AND USES THEREOF

CROSS-REFERENCE TO RELATED APPLICATIONS

This application claims priority to and the benefit of U.S. provisional application entitled "REUSABLE SURFACE-ENHANCED RAMAN SPECTROSCOPY MEMBRANES AND TEXTILES VIA TEMPLATE-ASSISTED SELF-ASSEMBLY AND MICRO/NANOIMPRINTING" having Ser. No. 63/151,501 filed Feb. 19, 2021.

STATEMENT REGARDING FEDERALLY SPONSORED RESEARCH OR DEVELOPMENT

This invention was made with government support under award FA9550-18-1-0328 awarded by the Air Force Office of Scientific Research. The government has certain rights in the invention.

TECHNICAL FIELD

The present disclosure generally relates to surface-enhanced Raman spectroscopy.

BACKGROUND

Surface-enhanced Raman spectroscopy (SERS) has become a powerful label-free biochemical analysis technique by detecting vibrational transition "fingerprint" signatures of analyte molecules.[16] SERS nanosensors based on plasmonic nanoantennas can be integrated with flexible and stretchable substrates to create wearable biochemical sensors at the interface with the human body.[17] The miniaturization of such wearable biochemical SERS sensor systems can be achieved using portable Raman analyzers, and ultimately smart watch like optoelectronics devices.[18] Recently, several types of wearable SERS substrates have been demonstrated by using incubation techniques, drop coating, or direct in situ synthesis to assemble plasmonic nanoparticles on commercially available silk zari or cotton fabrics.[19-21] Despite promising results, previous works on wearable SERS substrates still face some challenging issues. First, the conventional methods of assembling plasmonic nanoparticles on fabrics have poor uniformity control of plasmonic hotspots' distribution and sensitivity, which is detrimental to achieving consistent SERS sensing performance.[22] Second, most assembly techniques in previous works use weak van der Waals forces to bond plasmonic nanoparticles to the wearable substrates, which results in low mechanical robustness of SERS sensors and prevents their washing reusability.[19-21, 23]

Template-assisted self-assembly, a technique to use capillary force for self-assembling nanoparticles inside top-down fabricated templates of microstructures, has been used to fabricate hierarchically ordered arrays of plasmonic nanoparticles,[24-26] nanorods,[27-28] nanowires,[29] nanoprisms,[30] and nanocubes[30] with uniform and densely packed SERS hotspots. Self-assembled nanoparticle aggregates can support nanogap plasmonic modes with highly enhanced electromagnetic (EM) fields.[31] However, two processing-related issues prevent the widespread use of template-assisted self-assembly techniques to fabricate wearable SERS biochemical sensors. First, current template-assisted self-assembly techniques either transfer uniform plasmonic nanoparticle assemblies onto adhesive carriers (e.g., scotch tapes[4] or polydimethylsiloxane films[24]) or use a solution-based approach for transferring onto hydrophilic non-adhesive substrates (e.g., hydrophilized glass slides[6] or silicon wafers[25]) after slowly evaporating the nanoparticle solution confined between the template and substrate. Unfortunately, due to conventional fabric materials' highly absorbent properties, the solution-based transferring techniques are not compatible with the fabrication process to create porous textile-based wearable sensors. Second, the weak binding between assembled plasmonic nanostructures and the substrate based on the van der Waals forces still results in their poor mechanical robustness for many reusable real-life applications.[25, 26, 32]

There remains a need for improved SERS membranes and textiles and methods of fabricating the same.

SUMMARY

In various aspects, methods of making and fabricating SERS membranes and textiles that overcome one or more of the forementioned problems are provided. The methods can produce membranes and textiles that are mechanically robust, including membranes and textiles which are washable and reusable. The methods can include adhesively bonding a micropatch array to a substrate, the micropatch array comprising a plurality of micron-scale pillars, each of the micron-scale pillars in the plurality of micron-scale pillars comprising a plurality of plasmonic nanoparticles dispersed within a polymer matrix; and etching a portion of the polymer matrix to expose at least a portion of the plasmonic nanoparticles at or near a surface of the micron-scale pillars.

In some aspects, the micropatch arrays can be formed by a method including contacting a colloidal solution with a template, the template comprising a plurality of micron-scale wells, the colloidal solution comprising the plasmonic nanoparticles dispersed in a solvent; evaporating the solvent to self-assemble the plasmonic nanoparticles into the micron-scale wells.

In some instances, the method can include using plasmonic nanoparticles that include a capping agent such as a citrate that assists the plasmonic nanoparticles to self-assemble via evaporation induced self-assembly. In some instances, the methods can include attaching a capping agent such as a citrate to the plasmonic nanoparticles to facilitate the plasmonic nanoparticles to self-assemble via evaporation induced self-assembly. In some aspects, the methods further include applying a curable polymer to the template to form the micropatch array having the plasmonic nanoparticles dispersed in the polymer matrix.

In some aspects, the colloidal solution further includes a polymeric precursor, and the solvent evaporation causes the polymeric precursor to polymerize to leave the plasmonic nanoparticles dispersed in the polymer.

Suitable substrates can include various membranes, porous membranes, polymeric membranes, non-porous membranes, woven and non-woven textiles, knitted textiles, and the like.

The micron scale pillars can have dimensions including the micron-scale pillars comprise diameters, heights, or both from about 5 microns to about 50 microns or from about 10 microns to about 30 microns. Suitable plasmonic nanoparticles can include Au nanoparticles, Ag nanoparticles, Ru nanoparticles, Rh nanoparticles, Pd nanoparticles, or Pt nanoparticles.

The methods can be used to make various membranes or textiles. The membranes and textiles can include a substrate and a micropatch array adhesively bonded to the substrate, the micropatch array comprising a plurality of micron-scale pillars, each of the micron-scale pillars in the plurality of micron-scale pillars comprising a plurality of plasmonic nanoparticles dispersed within a polymer matrix and having at least a portion of the plasmonic nanoparticles exposed at or near a surface of the micron-scale pillars.

BRIEF DESCRIPTION OF THE DRAWINGS

FIG. 2A is a schematic illustration of the RIB process to expose the embedded SERS hotspots. FIG. 2B depicts the measured Raman spectra under 785 nm laser excitation for BZT molecules assembled on the surface of Au NP aggregates with different RIE treatment times (0, 1, 2, and 3 min). FIG. 2C depicts histogram of Raman signal intensities and corresponding SERS EFs (1077 cm$^{-1}$) for the samples with different RIE treatment times (0, 1, 2, and 3 min).

FIG. 3A depicts measured extinction spectra of the micropatch arrays of Au NP aggregates after 1, 3, and 5 cycles of the self-assembly process. FIG. 3B depicts measured Raman spectra of BZT molecules assembled on the surface of the Au NP aggregates after 1, 3, and 5 cycles of the self-assembly process. FIG. 3C depicts optical microscope images and the corresponding scanning confocal 2D Raman images (1077 cm$^{-1}$) of the micropatch arrays of Au NP aggregates after 1, 3, and 5 cycles of the self-assembly process. FIG. 3D depicts histogram of Raman signal intensities and corresponding EFs (1077 cm$^{-1}$) of the micropatch arrays of Au NP aggregates obtained from 3 different micropillar regions after 1, 3, and 5 cycles of the self-assembly process.

FIG. 4A is a schematic illustration of the experimental setup. FIG. 4B depicts a top-down camera image and bright-field microscopy image of a semipermeable SERS membrane on the meat surface. FIG. 4C depicts measured Raman spectra under 785 nm laser excitation for the SERS membrane on meat, the bare membrane containing 10$^{-3}$ M R6G, SERS membrane containing 10$^{-3}$ M R6G, and SERS membrane on meat containing R6G at different concentrations of 10$^{-7}$, 10$^{-6}$, 10$^{-5}$, 10$^{-4}$ and 10$^{-3}$ M. FIG. 4D depicts boxplots of Raman intensity (1185 cm$^{-1}$) for the SERS membrane on the meat surface containing R6G at different concentrations of 10$^{-7}$, 10$^{-8}$, 10$^{-5}$, 10$^{-4}$, and 10$^{-4}$ M. The five different bars from top to bottom represent the max, 75%, median, 25%, and min values of Raman intensity, respectively. FIG. 4E depicts boxplots of Raman intensity (1185 cm$^{-1}$) for the SERS membrane 0, 3, 5, 7, and 10 min after applying on the meat surface containing R6G at 10$^{-5}$ M. The five different bars from top to bottom represent the max, 75%, median, 25%, and min values of Raman intensity, respectively.

FIG. 5A depicts top-down optical image and bright field image of the SERS textile. FIG. 5B depicts optical image demonstrating stretchability of the SERS textile with a stretch percentage of 30%. FIG. 5C depicts Raman spectra measured 0, 3, 5, 8, 11, and 14 min after drop-casting 10$^{-5}$ M R6G solution on SERS textile under 785 nm laser excitation and FIG. 5D depicts the corresponding boxplots of Raman intensity (1185 cm$^{-1}$). The five different bars from top to bottom represent the max, 75%, median, 25%, and min values of Raman intensity, respectively.

FIG. 6A depicts schematic illustration of detergent-water washing with sonication for the regeneration of contaminated SERS hotspots. FIGS. 6B-6C depict measured Raman spectra (FIG. 6B) and the corresponding Raman intensities (1185 cm$^{-1}$) (FIG. 6C) of the SERS textile with three cycles of 10$^{-5}$ M R6G adsorption and ultrasound sonication washing. The five different bars from top to bottom represent the max, 75%, median, 25%, and min values of Raman intensity, respectively. FIG. 6D depicts schematic illustration of detergent-water washing by magnetic stirring. FIGS. 6E-6F depict measured Raman spectra (FIG. 6E) and the corresponding Raman intensities (1185 cm$^{-1}$) (FIG. 6F) of the SERS textile with three cycles of 10$^{-5}$ M R6G adsorption and stirring washing. The five different bars from top to bottom represent the max, 75%, median, 25%, and min values of Raman intensity, respectively.

FIG. 9A depicts measured Raman spectra under 785 nm excitation of different concentrations of adenine solution on the micropatch array of Au NP aggregates FIG. 9B depicts the corresponding boxplots of normalized Raman intensity (732 cm$^{-1}$) for 10$^{-7}$, 10$^{-6}$, 10$^{-5}$, 10$^{-4}$, and 10$^{-3}$ M adenine. The five different bars from top to bottom represent the max, 75%, median, 25%, and min values of normalized Raman intensity respectively.

DETAILED DESCRIPTION

Figure 1:
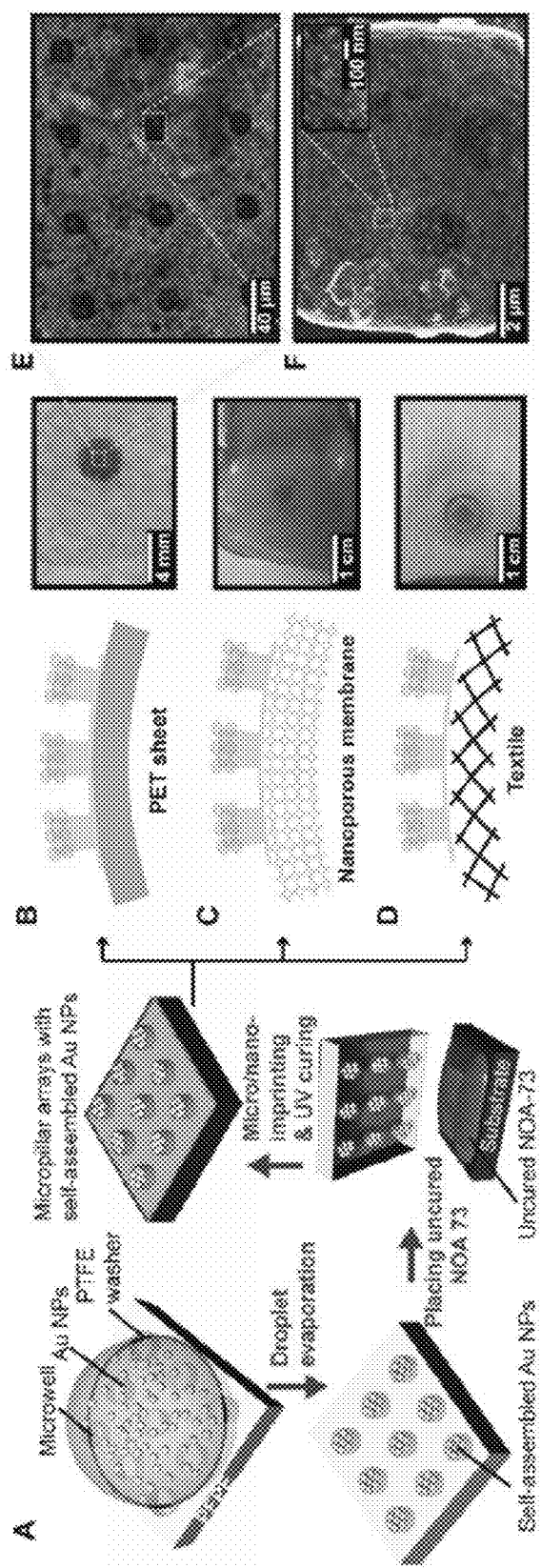
FIG. 1 is a schematic depicting the steps of generation of Au NP aggregate micropatch array by template-assisted self-assembly and UV micro/nanoimprinting (Panel A) as well as separate schematics and top-down optical images of the micropatch arrays of Au NP aggregates fabricated on (Panel B) a PET sheet, (Panel C) a nanoporous semipermeable transparent membrane, and (Panel D) a stretchable textile. Panel E of FIG. 1 shows a top-down bright field image of the micropatch arrays of Au NP aggregates fabricated on a PET sheet. Panel F of FIG. 1 depicts top-down SEM image of one micropillar containing Au NP aggregates. The inset in Panel F shows a zoomed-in SEM image of the Au NP aggregates on the micropillar.

In some aspects, washing reusable wearable SERS sensors are provided. In some aspects, methods are provided for fabricating washing reusable wearable SERS sensors via template-assisted self-assembly of Au nanoparticles (NPs) within highly hydrophobic microwell templates, followed by their transfer onto wearable membranes and textiles by micro/nanoimprinting using a UV curable resist. Compared to previous works, wearable SERS devices by template-assisted self-assembly and micro/nanoimprinting fabrication can offer unique advantages. First, template-assisted self-assembly by capillary force can generate micropatch arrays of plasmonic nanoparticle aggregates with improved uniformity of plasmonic hotspots for high-performance SERS monitoring.[3] Second, the mild UV micro/nanoimprinting process at ambient temperatures is compatible with many flexible micro/nano structured membrane/fabric materials to create ideal wearable SERS devices.

The robust integration of self-assembled NP aggregate plasmonic hotspots with wearable membrane/fabric materials of suitable properties in stretchability, micro/nanoscale porosity, and transparency, can lead to application specific advantages. For instance, stretchable wearables integrated with nanosensors provide a comfortable interface with the skin/nanoporous polymeric dressing membranes are selectively permeable for wound protection/and transparent wearables enable on-site detection capability.[17, 34] Third, the strong bonding between self-assembled Au NPs and the wearable substrates by UV-cured resist can result in mechanically robust SERS devices, allowing repeated washing processes to regenerate the contaminated SERS hotspots. Most previous works achieve the regeneration of contaminated SERS hotspots by using complicated or aggressive techniques such as reactive ion etching (RIE),[35] photocatalysis,[36] $NABH_4$ treatment,[37] and thermal cleaning,[38] which typically require sophisticated laboratory equipment and trained professionals, and can even induce damage to many membrane/fabric materials. This work demonstrates the feasibility of implementing a user-friendly detergent-water washing process with simple sonication or mechanical stirring for repeated cleaning of contaminated hotspots on the SERS fabrics. These washing techniques can be achieved with a washing machine to clean the hotspots for reusing the SERS devices during laundry of the dirty wearables.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant specification should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Embodiments of the present disclosure will employ, unless otherwise indicated, techniques of nanotechnology, organic chemistry, material science and engineering and the like, which are within the skill of the art. Such techniques are explained fully in the literature.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

In some instances, units may be used herein that are non-metric or non-SI units. Such units may be, for instance, in U.S. Customary Measures, e.g., as set forth by the National Institute of Standards and Technology, Department of Commerce, United States of America in publications such as NIST HB 44, NIST HB 133, NIST SP 811, NIST SP 1038, NBS Miscellaneous Publication 214, and the like. The units in U.S. Customary Measures are understood to include equivalent dimensions in metric and other units (e.g., a dimension disclosed as "1 inch" is intended to mean an equivalent dimension of "2.5 cm"; a unit disclosed as "1 pcf" is intended to mean an equivalent dimension of 0.157 $kN/m^3$; or a unit disclosed 100° F. is intended to mean an equivalent dimension of 37.8° C.; and the like) as understood by a person of ordinary skill in the art.

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

In various aspects, methods of making and fabricating SERS membranes and textiles that overcome one or more of the forementioned problems are provided. The methods can produce membranes and textiles that are mechanically robust, including membranes and textiles which are washable and reusable. The methods can include adhesively bonding a micropatch array to a substrate, the micropatch array comprising a plurality of micron-scale pillars, each of the micron-scale pillars in the plurality of micron-scale pillars comprising a plurality of plasmonic nanoparticles dispersed within a polymer matrix; and etching a portion of the polymer matrix to expose at least a portion of the plasmonic nanoparticles at or near a surface of the micron-scale pillars.

In some aspects, the micropatch arrays can be formed by a method including contacting a colloidal solution with a template, the template comprising a plurality of micron-scale wells, the colloidal solution comprising the plasmonic nanoparticles dispersed in a solvent; evaporating the solvent to self-assemble the plasmonic nanoparticles into the micron-scale wells.

In some instances, the method can include using plasmonic nanoparticles that include a capping agent such as a citrate that assists the plasmonic nanoparticles to self-assemble via evaporation induced self-assembly. In some instances, the methods can include attaching a capping agent such as a citrate to the plasmonic nanoparticles to facilitate the plasmonic nanoparticles to self-assemble via evaporation induced self-assembly. In some aspects, the methods further include applying a curable polymer to the template to form the micropatch array having the plasmonic nanoparticles dispersed in the polymer matrix.

In some aspects, the colloidal solution further includes a polymeric precursor, and the solvent evaporation causes the polymeric precursor to polymerize to leave the plasmonic nanoparticles dispersed in the polymer.

Suitable substrates can include various membranes, porous membranes, polymeric membranes, non-porous membranes, woven and non-woven textiles, knitted textiles, and the like.

The micron scale pillars can have dimensions including the micron-scale pillars comprise diameters, heights, or both from about 5 microns to about 50 microns or from about 10 microns to about 30 microns. Suitable plasmonic nanoparticles can include Au nanoparticles, Ag nanoparticles, Ru nanoparticles, Rh nanoparticles, Pd nanoparticles, or Pt nanoparticles.

The methods can be used to make various membranes or textiles. The membranes and textiles can include a substrate and a micropatch array adhesively bonded to the substrate, the micropatch array comprising a plurality of micron-scale pillars, each of the micron-scale pillars in the plurality of micron-scale pillars comprising a plurality of plasmonic nanoparticles dispersed within a polymer matrix and having at least a portion of the plasmonic nanoparticles exposed at or near a surface of the micron-scale pillars.

EXAMPLES

These examples demonstrate the creation of washing reusable SERS membranes and textiles via template-assisted self-assembly and micro/nanoimprinting approaches. Uniquely, we employ the capillary force driven self-assembly process to generate micropatch arrays of Au nanoparticle (NP) aggregates within hydrophobic microstructured templates, which are then robustly bonded onto semipermeable transparent membranes and stretchable textiles using the UV-resist based micro/nanoimprinting technique. A mild reactive ion etching (RIE) treatment of SERS membranes and textiles can physically expose the SERS hotspots of Au NP-aggregates embedded within the polymer UV resist for further improvement of their SERS performance. Also, we demonstrate that the semipermeable transparent SERS membranes can keep the moisture content of meat from evaporating to enable stable in situ SERS monitoring of biochemical environments at the fresh meat surface. By contrast, stretchable SERS textiles can allow the spreading, soaking, and evaporation of solution analyte samples on the fabric matrix for continuous enrichment of analyte molecules at the hotspots in biochemical SERS detection. Due to the mechanical robustness of the UV-resist immobilized Au NP aggregates, simple detergentwater washing with ultrasound sonication or mechanical stirring can noninvasively clean contaminated hot spots to reuse SERS textiles. Therefore, washing reusable SERS membranes and textiles by template-assisted self-assembly and micro/nanoimprinting fabrication are promising for wearable biochemical sensing applications, such as wound monitoring and body fluid monitoring.

Fabrication of Hierarchically Ordered Plasmonic Arrays

A negative photoresist (SUS-2007, Kayaku Advanced Materials Inc., Westborough, Mass.) based 2D array of microwells (periodicity=64, diameter=16 µm, height=10 µm) was patterned on a silicon wafer using conventional photolithography. A PDMS mold was replicated from the SUS master to obtain a micropillar array. Subsequently, polymer microwell arrays were replicated from the PDMS mold on a PET sheet using PFPE UV curable polymer (Fluorolink PFPE, Solvay, Belgium). PFPE was squeezed between the mold and PET sheet and cured by UV for 3 min under 2 bar pressure followed by UV curing for 3 min under vacuum (Compact Nanoimprint v2.0, NIL Technology, Denmark) and postannealing at 80° C. for 1 h. The PFPE microwell array was plasma treated by a tabletop RIE system (RIE-1 C, Samco, Japan) with an oxygen flow of 30 seem and RF power of 50 W for 1 min. Then, PTFE flat washers (0.125 in. inner diameter) were attached to the PFPE microwells' surface using super glue. Commercially available Au NP solution (diameter=30 nm, $1.84\times10^{11}$ nps/ml, Nanopartz Inc.) was sonicated for 5 min at room temperature followed by vortex for 10 min. Then, 20 µL of the Au NP solution was drop-casted on the PFPE microwell arrays within the PTFE washers and followed by evaporation in a vacuum for 6 h; and this process was repeated over multiple cycles to increase the surface density of NPs self-assembled in PFPE microwells. After removing the PTFE washers, we conducted UV micro/nanoimprinting using UV curable polymer (NOA 73, Norland Product Inc., Cranberry, N.J.) to transfer Au NP aggregates from PFPE microwell arrays to different types of substrates, including PET sheets, nanoporous membranes (Nexcare Tegaderm transparent dressing, 3M, St Paul, Minn.), and stretchable textiles. During the micro/nanoimprinting process, PU resist was sandwiched between the PFPE mold, and the substrate and UV curing was performed for 3 min under 2 bar pressure. To further expose the embedded SERS hotspots of Au NP aggregates, we performed the RIE treatment for fabricated SERS substrates in the plasma of 02 (5 sccm) and $CF_4$ (25 sccm) mixtures under the RF power of 30 W.

Optical and Raman Measurements

We measured the extinction spectra of samples using a UV-vis-NIR spectrophotometer (Cary 5000, Agilent, Santa Clara, Calif.). For SERS measurements, we used a confocal Raman microscope (alpha 300 RSA+, Wltec, Germany) equipped with a 785 nm diode laser (Xtra II, Toptica, Germany) and detected the backscattered photons with a spectrometer (UHTS300, Wltec, Germany) equipped with a CCD camera (DU401A, Oxford Instruments, UK). After the signal acquisition, we conducted the cosmic rays removal and baseline correction using the Project v4.1 Software (WITec, Germany) and applied the hotspot normalization process.[59]

SERS EF Calculation

To evaluate the SERS EFs for the hotspots on the samples, we used BZT (Sigma-Aldrich, St Louis, Mo.) as the non-resonant Raman probe molecules to form a self-assembled monolayer on the SERS substrates and then incubated the samples in BZT ethanolic solution ($1\times10^{-3}$ M) for 24 h, followed by ethanol rinsing. The SERS EF was calculated using the formula, $$EF = \left(\frac{I_{SERS}}{I_{Raman}}\right) \times \left(\frac{N_{Raman}}{N_{SERS}}\right)$$

where $I_{SERS}$ is the measured SERS Intensity, $I_{Raman}$ is the neat BZT Raman intensity, and $N_{SERS}$ and $N_{Raman}$ are the numbers of BZT molecules contributing to SERS and neat Raman intensity, respectively. For where $I_{SERS}$ and $I_{Raman}$ we measured the 1077 and 1094 $cm^{-1}$ peaks, which originate from the C—C—C ring in-plane breathing mode with C—S stretching mode. $N_{SERS}$ was calculated as $N_{SERS}=SA\times\rho_{SERS}$ where SA is the metal surface area contributing to the SERS enhancement, and $\rho_{SERS}$ is the packing density of BZT on the Au NP surface ($6.8\times10^{14}$ molecules $cm^{-2}$). To calculate SA, we assumed that the Au NPs are packed in a simple cubic lattice. $N_{Raman}$ was calculated as, $N_{Raman}=A\times d_{eff}\times \rho_{BZT}$, where A is the focused illumination area, $d_{eff}$ is the effective depth of the laser beam spot, and $\rho_{BZT}$ is the density of neat BZT ($5.9\times10^{21}$ molecules $cm^{-2}$). To calculate $d_{eff}$ we measured the Raman intensity value of bare Si (527 $cm^{-1}$) averaged from 10 spectra at different z-positions of the objective lens.

In Situ SERS Monitoring of the Meat Surface with SERS Membranes

Pork feet were purchased from the local supermarket. The aqueous solution of R6G (Sigma-Aldrich) was drop-casted on the meat surface, and the SERS membrane was applied on the meat surface in SERS measurements.

Regeneration of Contaminated SERS Hotspots by Sonication Washing.

$10^{-5}$ M R6G was drop-casted on the SERS textiles and allowed to evaporate for 20 min. After conducting Raman measurements of R6G deposited SERS textiles, we placed the samples in a sonication bath containing DI water and detergent (powdered precision cleaner, Alconox Inc., White Plains, N.Y.) for 1 h sonication treatment at 50° C. After rinsing samples with DI water to remove the excess detergent and allowing them to dry, we conducted Raman measurements on the washed samples to check R6G residue levels in hotspots from the sonication-cleaning process.

Magnetic Stirring Supplemented Detergent Washing to Regenerate SERS Hotspots.

After drop-casting $10^{-5}$ M R6G solution on the SERS textiles and allowing them to dry for 20 min, we conducted Raman measurements and then placed the samples in a beaker containing DI water and detergent. We first conducted mechanical stirring in the detergent solution with magnet bars at 800 rpm for 1 h at 75° C. and replaced the detergent solution with DI water to apply additional mechanical stirring for the washing samples 10 min at 75° C. After rinsing samples with DI water and allowing them to dry, we conducted Raman measurements on the washed samples to check R6G residue levels in hotspots from the stirring cleaning process.

Results and Discussion

Fabrication of Micropatch Arrays of Au NP Aggregates.

Panel A of FIG. 1 illustrates the template-assisted self-assembly and UV micro/nanoimprinting processes to create the micropatch arrays of Au NP aggregates. First, citrate capped Au NP solution was deposited within regions confined by polytetrafluoroethylene (PTFE) washers on perfluoropolyether (PFPE) microstructured templates. The solvent evaporation can induce capillary force-driven self-assembly of Au NP aggregates into micropatch arrays within the microstructured templates. Then, we conducted UV micro/nanoimprinting using UV curable polyurethane (PU) resist to bond micropatch arrays of Au NP aggregates to different types of substrates, including polyethylene terephthalate (PET) sheets, nanoporous semipermeable transparent membranes, and stretchable textiles. Lastly, we conducted reactive ion etching (RIE) treatment on SERS devices in the plasma of oxygen and $CF_4$ mixtures to expose the SERS hotspots of Au NP aggregates embedded in the cured UV resist.

By the processes of template-assisted self-assembly and UV micro/nanoimprinting, micropatch arrays of Au NP aggregates showing reddish color in optical camera images can be generated on different types of substrates, including flexible PET sheets (FIG. IB), semipermeable transparent membranes (Panel C of FIG. 1F), and stretchable macroporous textiles (Panel D of FIG. 1). As shown in the top-down bright-field microscope image (Panel E of FIG. 1), micropatch arrays of Au NP aggregates imprinted on a PET sheet exhibit a dark appearance due to the absorption at plasmonic resonant frequencies. The scanning electron microscope (SEM) images in Panel F of FIG. 1 confirm the presence of densely packed Ag NP aggregates on the top surface of micropillar arrays.

Exposure of Embedded SERS Hotspots by RIE Treatment

Figure 2A:
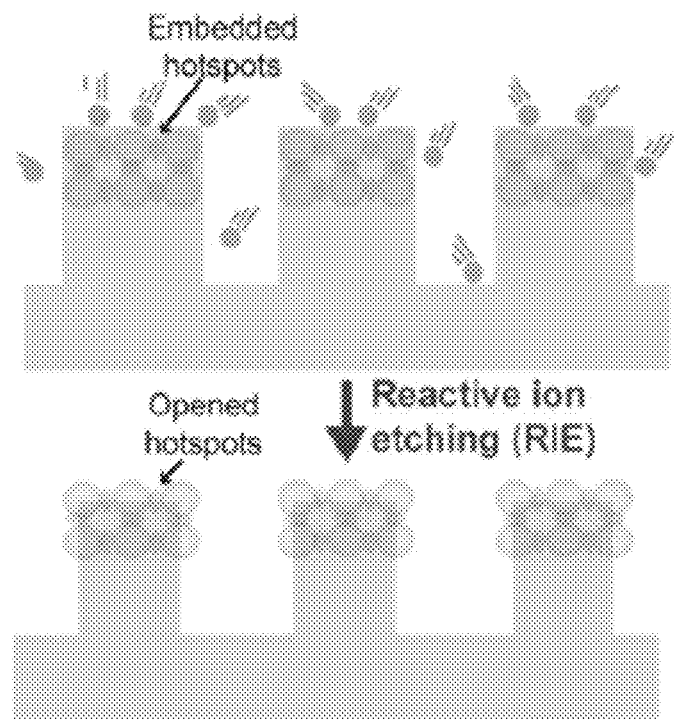
FIGS. 2A-2C demonstrate exposure of embedded SERS hotspots by RIB.
Figure 2B:
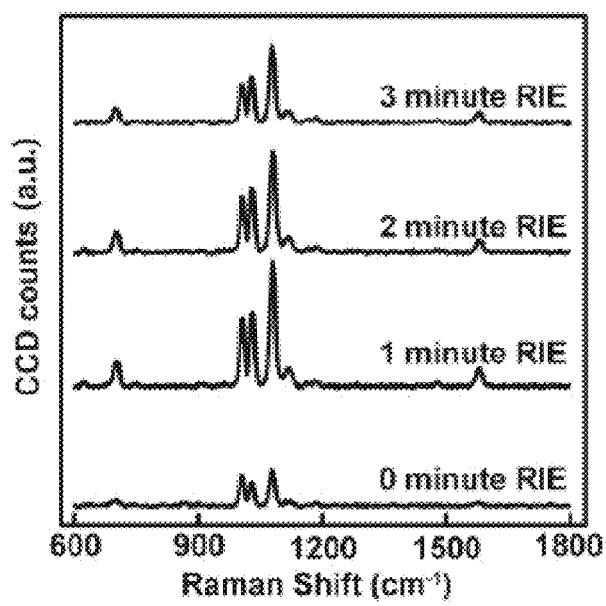

Due to the viscous fluidic nature of uncured UV resist, most SERS hotspots of Au NP-aggregates will be embedded in the cured UV resist of micropillar arrays after the UV micro/nanoimprinting process. Therefore, we exploit the RIE process to expose embedded SERS hotspots of Au NPaggregates for their accessibility to analytes in SERS measurements. As illustrated in FIG. 2A, the accelerated radicals in the plasma of oxygen and CF 4 mixtures can etch the PU via a combination of physical bombardment and chemical reaction processes. To find the optimized etching condition resulting in large SERS enhancement factors (EFs) and uniform hotspot distributions, we tested different RIE treatment times for the fabricated SERS devices at the same RIE condition (30 W, 25 sccm $CF_4$, and 5 sccm $O_2$). For the evaluation of SERS performance, we used a self-assembled monolayer of benzenethiol (BZT) molecules[39] as the non-resonant Raman probe to functionalize Au NP-aggregate micropatch arrays from five self-assembly cycles. FIG. 2B shows the Raman spectrum of BZT with RIE treatment at 0, 1, 2, and 3 min under 785 nm laser excitation with a 20× objective lens. The five significant peaks at 700, 1001, 1026, 1077, and 1576 cm$^{-1}$ correspond to the carbon-carbon-carbon (C—C—C) ring inplane bending mode with carbon-sulfur (C—S) stretching mode, the C—C—C ring in-plane bending mode, the carbon-hydrogen (C—H) in-plane bending mode, the C—C—C ring in-plane breathing mode with C—S stretching mode, and the C—S stretching mode respectively for BZT molecules.[40]

Compared to the nonetched case (0 min RIE treatment), the sample with 1 min RIE treatment shows an increased SERS intensity by 4 times. As the RIE treatment time further increases from 1 to 2 and 3 min, the SERS signal intensity continuously decreases, suggesting the loss of the SERS hotspots due to the RIE undercutting induced structural degradation of the polymer supporting matrix for Au NP aggregates.

Figure 2C:
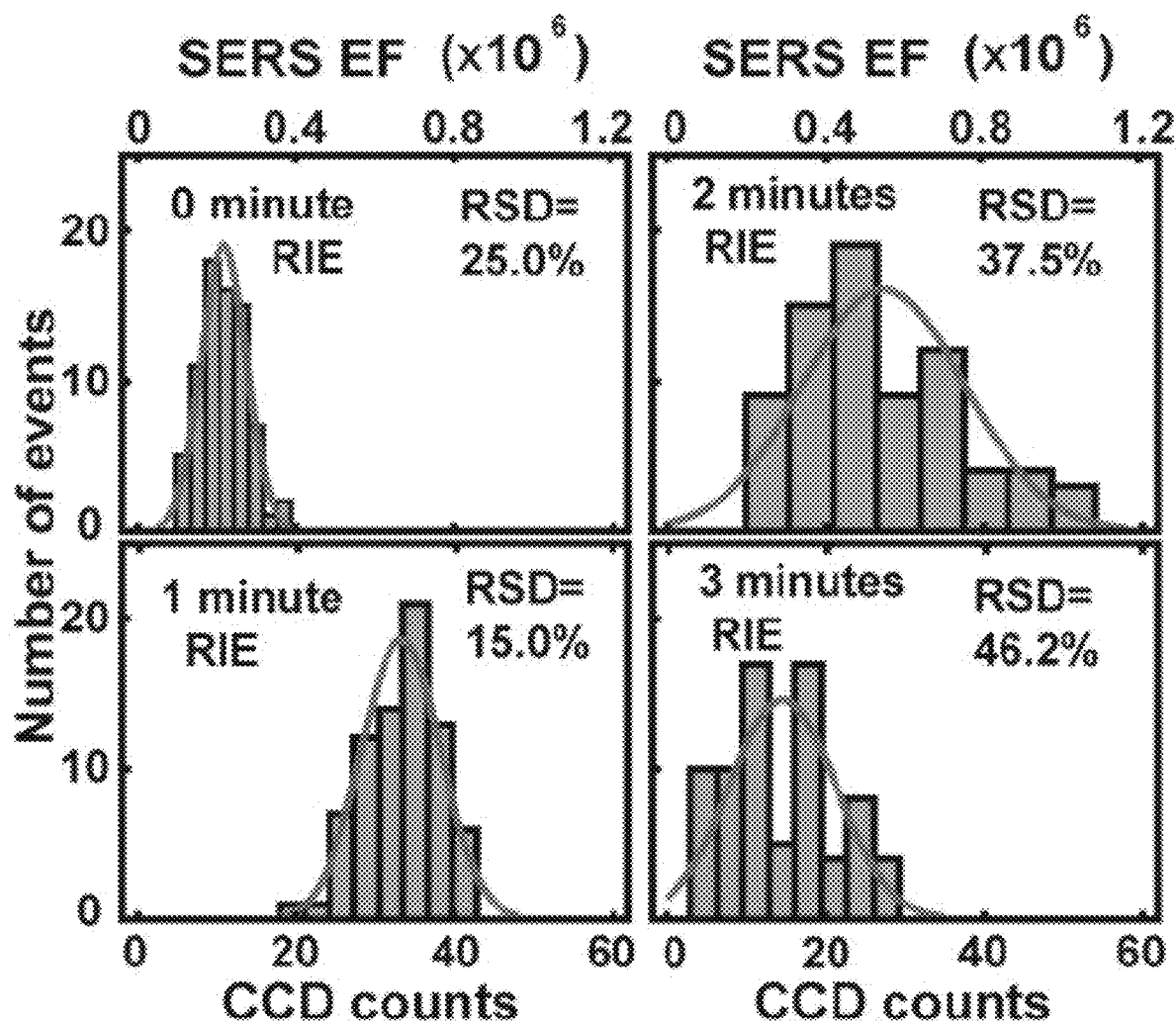
Figure 7A:
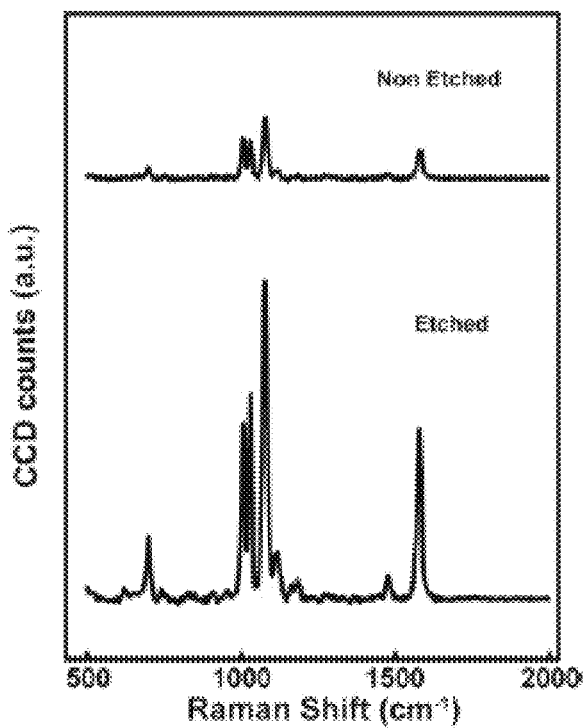
FIG. 7A depicts the measured Raman spectra for BZT molecules assembled on the surface of Au NP aggregates before RIE, and after 1 minute RIE under 785 nm laser excitation obtained with a 100× objective lens.
Figure 7B:
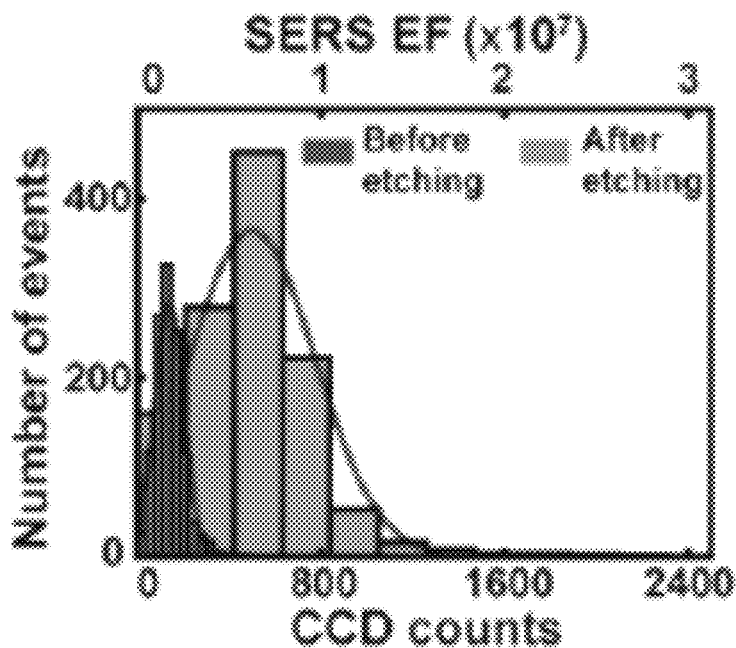
FIG. 7B depicts histogram of Raman signal intensities and corresponding EFs (1077 cm$^{-1}$) before RIE and after 1-minute RIE treatment.
Figure 7C:
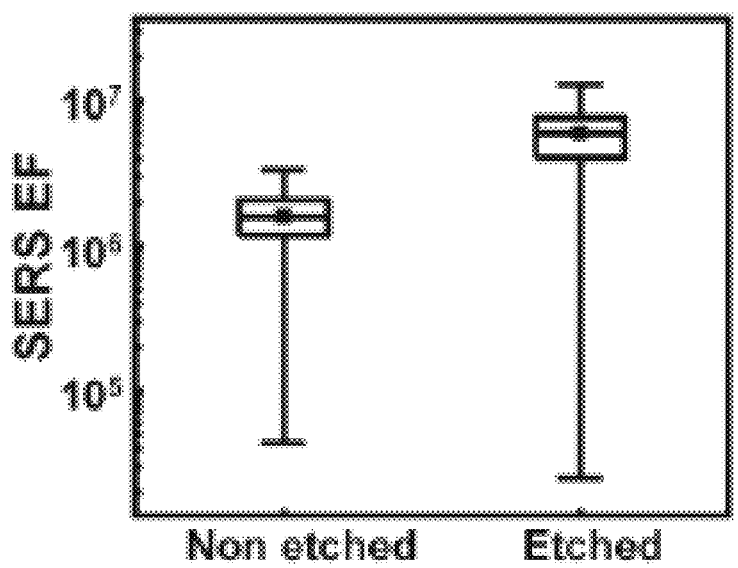
FIG. 7C depicts boxplots of SERS EF before RIE and after 1-minute RIE treatment. The five different bars from top to bottom represent the max, 75%, median, 25%, and min values of SERS EFs, respectively.

For assessing the change in SERS performance with RIE treatment time, we plotted the histograms of the 1077 cm$^{-1}$ peak Raman intensity and the corresponding SERS EFs from 75 pixels sampled in 3 different regions micropillars (FIG. 2C). As the RIE treatment time increases from 0 to 1 min, the average value of SERS EFs increases from $2.3 \times 10^5$ to $7.4 \times 10^5$, and the relative standard deviation (RSD) value of SERS EFs decreases from 25.0% to 15.0%, which manifests the exposure of embedded hotspots with a uniform distribution over a large sample area. As the RIE treatment time further increases from 1 to 2 and 3 min, the average value of SERS EFs continuously decreases from $7.4 \times 10^5$ to $6.0 \times 10^5$ and $3.0 \times 10^5$ while the RSD value of SERS EFs increases from 15.0% to 37.5% and 46.2%, which reveals that prolonged RIE undercutting of polymer supporting matrix of Ag NP aggregates can cause more loss of SERS hotspots. Unlike the samples with 2- and 3 min RIE treatment (FIG. 2C), the histogram plots for the samples under 0- and 1 min RIE treatment exhibit a normal distribution profile with peak positions close to the mean EF value, which statistically confirms the presence of a more uniform distribution of hotspots.[41] Since samples with 1 min RIE treatment displayed the highest SERS sensitivity and uniformity, we used this RIE condition (1 min, 30 W, 25 sccm CF$_4$, and 5 sccm O$_2$) to expose embedded hotspots of SERS samples in all the subsequent experiments. Notably, by using a 100× objective lens with a larger numerical aperture (NA), higher Raman signal intensities can be collected to generate a one-order larger SERS EF ($7.0 \times 10^6$) than using a 20× objective lens for the same SERS samples under 1 min RIE treatment (FIG. 7).

Effects of the Self-Assembly Cycle Number on the Device SERS Performance.

The density of Au NPs assembled on the bottom surface of PFPE microwells can be increased by conducting multiple cycles of Au NP drop-casting and self-assembly processes. Therefore, it is crucial to investigate the effects of the self-assembly cycle number on the optical properties and the SERS performance of the fabricated Au NP aggregate micropatch arrays. For this purpose, we drop-casted 20 μL (1 cycle), 60 μL (three cycles), and 100 μL (five cycles) of Au NP solutions on the microwell PFPE templates. Following the evaporation and drying of Au NP solutions, we conducted UV micro/nanoimprinting to bond the micropatch arrays of self-assembled Au NP aggregates onto PET sheets and performed RIE treatment (30 W, 25 sccm CF$_4$ and 5 sccm O$_2$, 1 min) to expose the embedded hotspots.

Figure 3A:
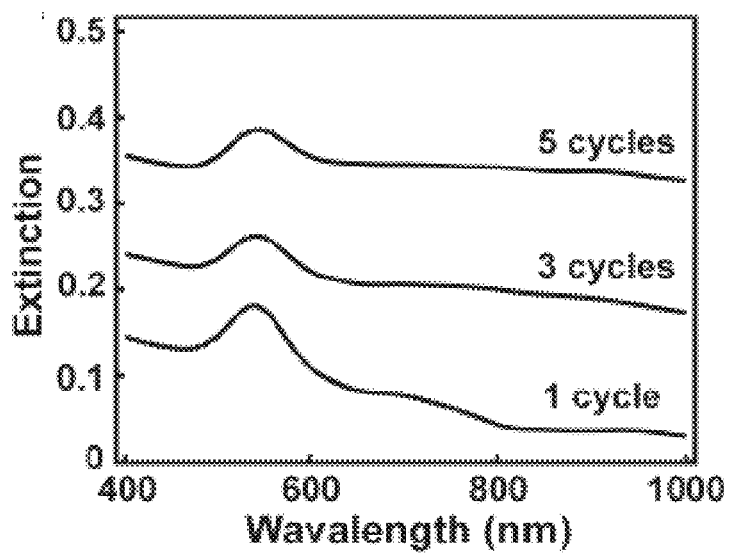
FIGS. 3A-3D demonstrate dependence of the optical and SERS properties on the self-assembly cycle number.

FIG. 3A shows the measured extinction spectra from 1, 3, and 5 cycles of drop-casting and self-assembly with 20 μL Au NP solution. While uncoupled Au NPs (30 nm diameter) in the solution are featured with a localized surface plasmon resonance peak at 522 nm,[42] Au NP aggregate micropatches from 1-, 3-, and 5-cycle self-assembly processes show the extinction peaks with red-shifted resonant wavelengths between 536 and 543 nm due to the near-field coupling between individual Au NPs.[25, 41, 42] As the self-assembly cycle number increases from 1 to 3 and 5, the extinction peak amplitude increases from ~0.15 to ~0.25 and ~0.36, revealing the increased surface density of Au NPs in micropatch arrays.

Figure 3B:
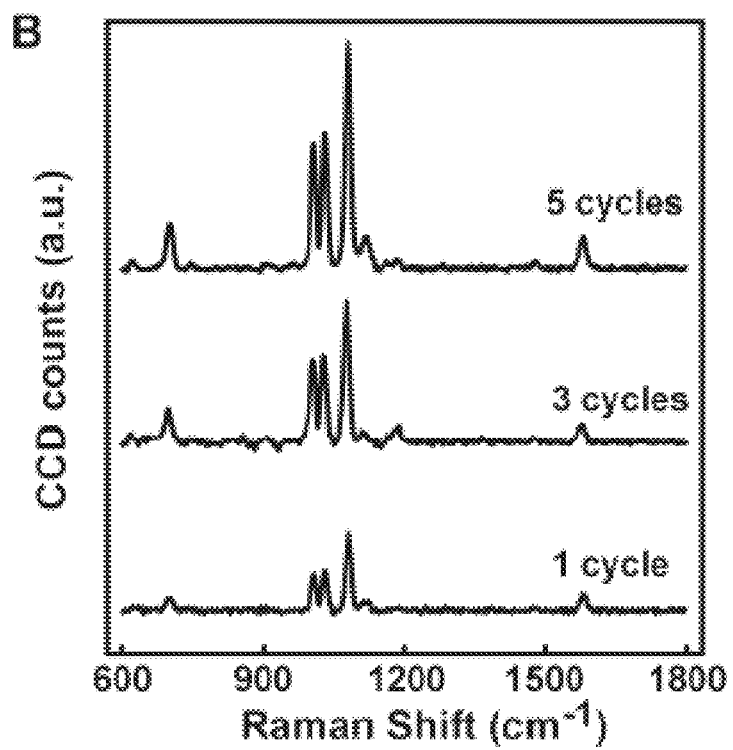
Figure 3C:
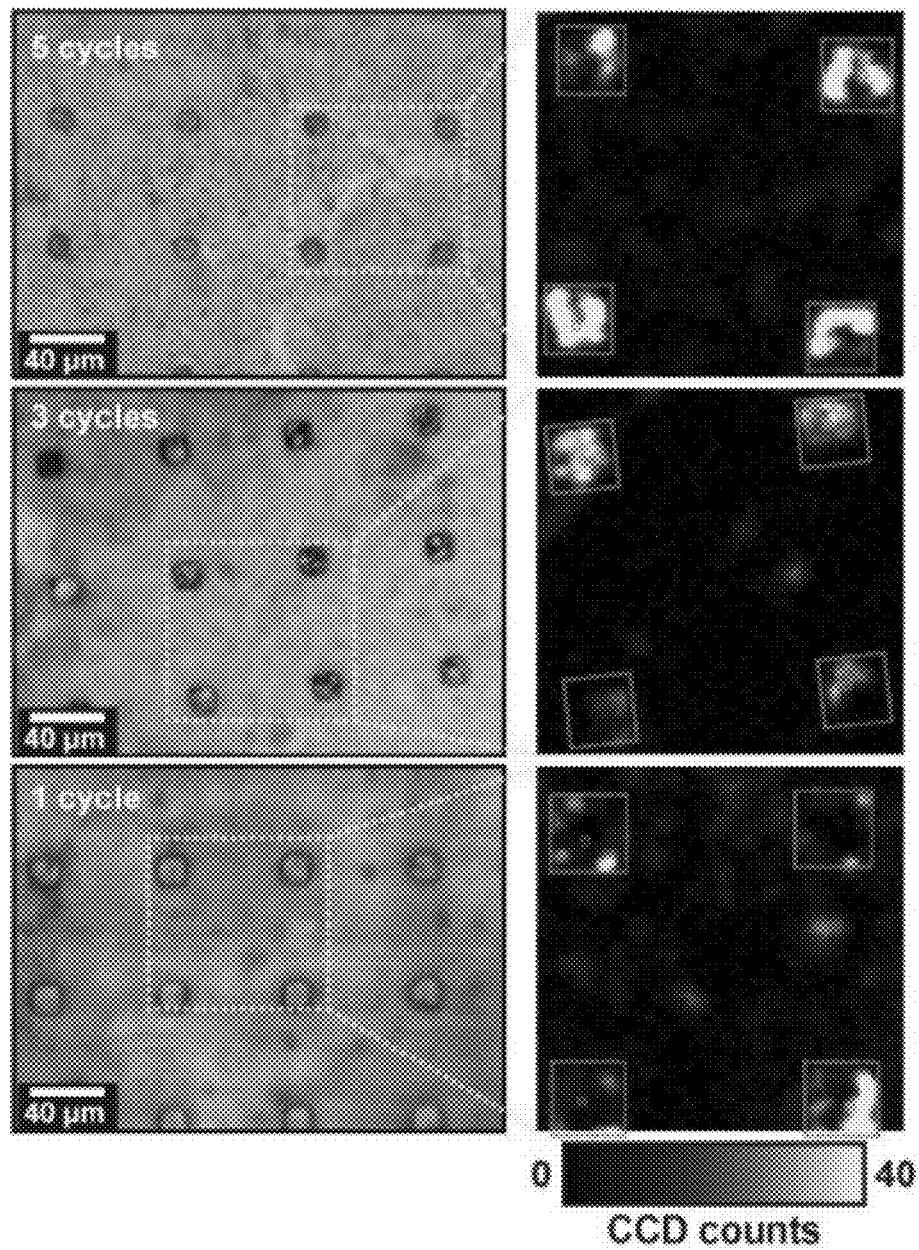
Figure 3D:
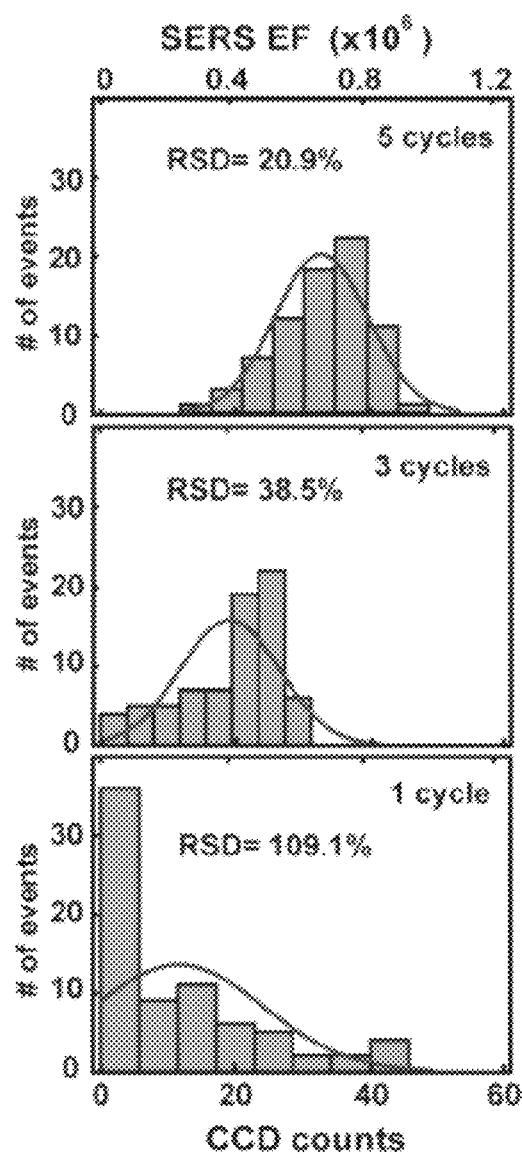
Figure 8:
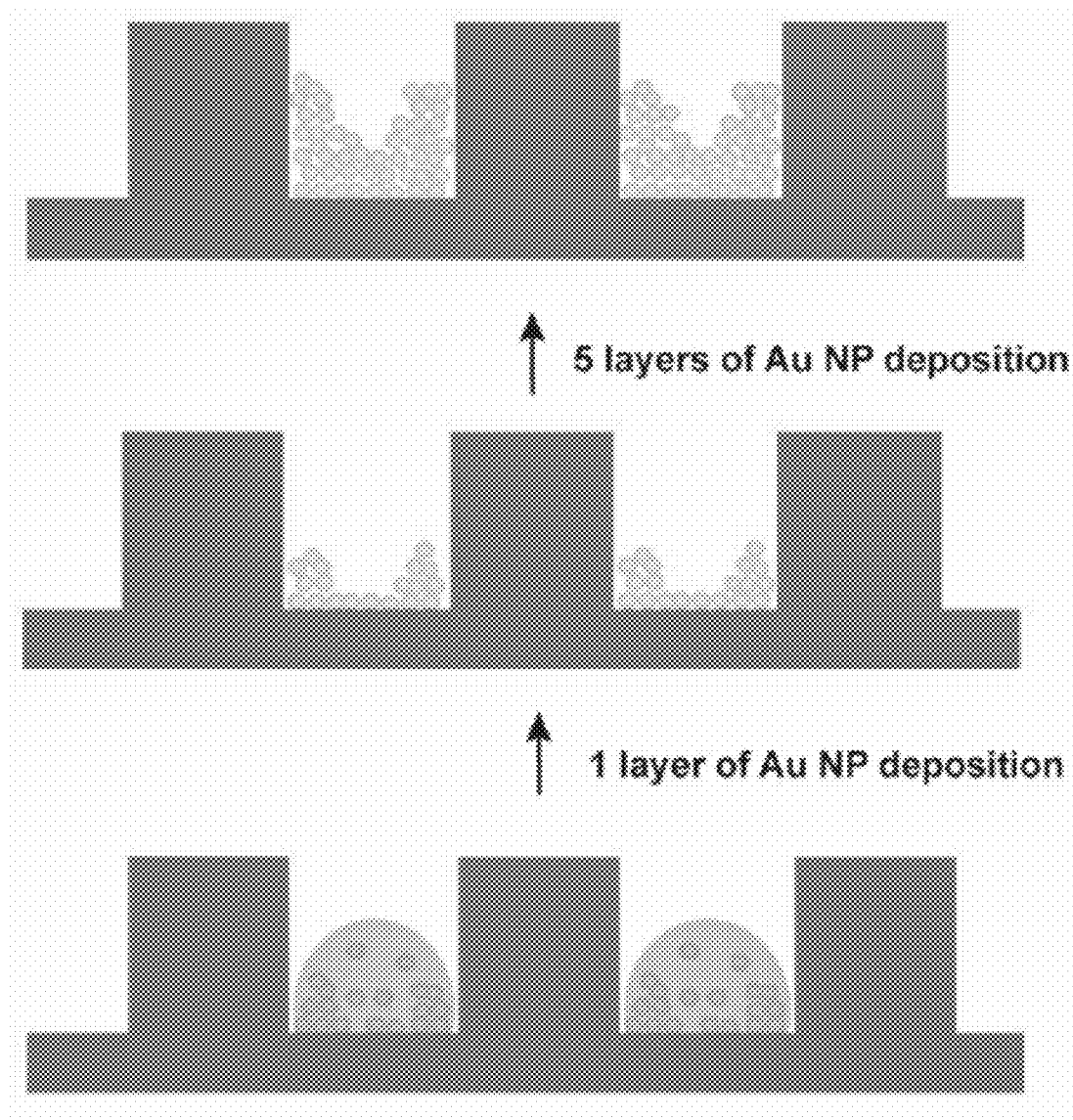
FIG. 8 depicts schematic depicting the proposed mechanism for the confinement of Au NPs within the microwell array.

FIG. 3B illustrates the SERS performance of Au NP aggregate micropatches from 1-, 3-, and 5-cycle self-assembly processes and the Raman spectrum of BZT was obtained from a micropillar region. As the number of self-assembly cycles increases from 1 to 3 and 5, different BZT Raman peaks increase in their amplitude. To examine the spatial distribution of hotspots for samples from different numbers of selfassembly cycles, we obtained 2D confocal Raman images for the BZT peak at the 1077 cm$^{-1}$ compared to the corresponding bright-field microscope images (FIG. 3C). For the sample from 1-cycle self-assembly, most SERS hotspots exist at the edge regions on micropillars, revealing that Au NPs tend to occupy the geometrical edge regions. As the number of self-assembly cycles increases from 1 to 3 and 5, SERS hotspot regions on the samples show increased coverage areas and spread from the edges to micropillars' inner part. The observations of preferential accumulation of SERS hotspots of Au NP aggregates at edges can be attributed to the formation of menisci for Au NP solution confined inside hydrophobic PFPE microwells and the coffee ring effect during the evaporation process (FIG. 8).[27, 43] With more selfassembly cycles through the evaporation process, the selfassembled Au NPs first occupy the peripheral edge regions and then extend to fill the inner regions of PFPE microwells. FIG. 3D shows the Raman peak histogram plots at 1077 cm-1 for samples from 1- to 3- and 5-self-assembly cycles, measured using the 2D confocal Raman microscopy over 75 pixels in regions of 3 different micropillars. As the self-assembly cycle number increased from 1 to 3 and 5, the averaged SERS EFs increase from $2.4 \times 10^5$ to $4.3 \times 10^5$ and $7.3 \times 10^5$ while the RSD value decreases from 109.1% to 38.5% and 20.9%. These results suggest that it is possible to increase further the surface coverage density/uniformity of Au NPs and SERS performance of self-assembled and micro/nanoimprinted micropatch arrays of Au NP aggregates by optimizing the NP concentrations in the drop-casted solutions as well as the evaporation rates during the self-assembly process.

In Situ SERS Monitoring of the Meat Surface with Transparent SERS Membranes.

Figure 4A:
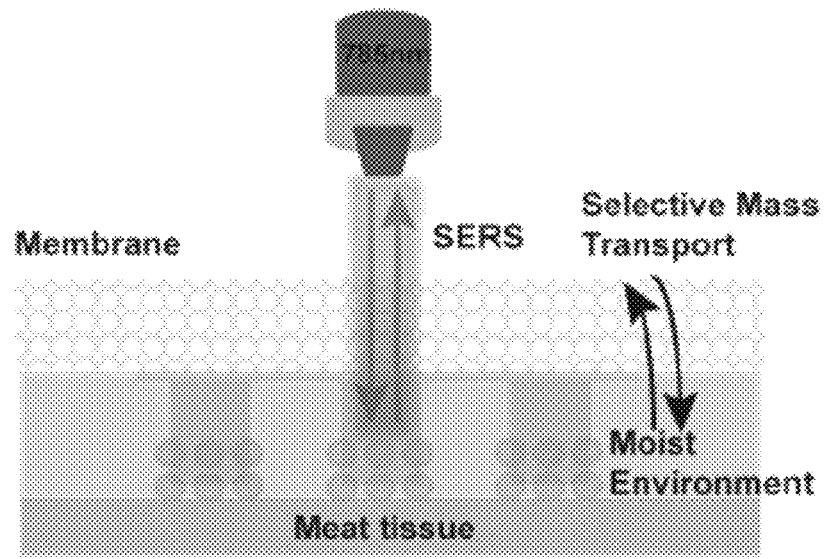
FIGS. 4A-4E depict in-situ SERS monitoring of the meat surface with SERS membranes.
Figure 4B:
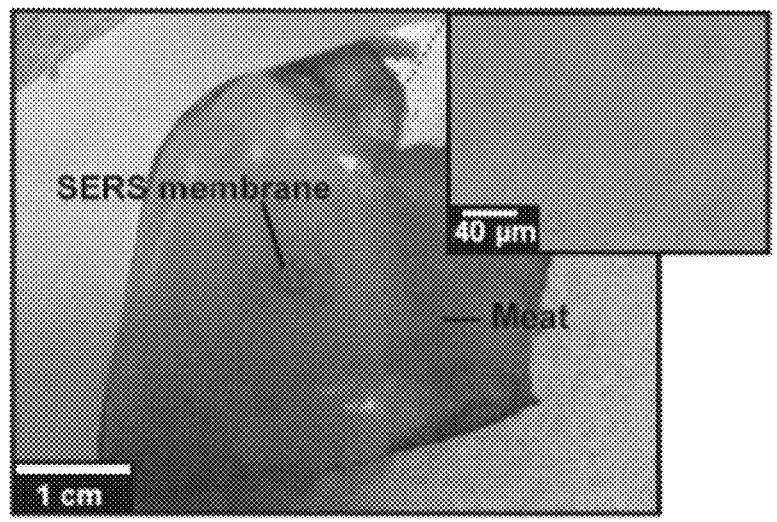

As shown in FIGS. 4A-4B, we exploit template-assisted self-assembly and micro/nanoimprinting to create novel semipermeable transparent SERS membranes consisting of Au NP aggregate micropatch arrays. Such semipermeable transparent SERS membranes can potentially be used in wound monitoring applications by (1) allowing for in situ SERS biochemical sensing and (2) maintaining a breathable, bacteria-free, and waterproof environment.

Figure 4C:
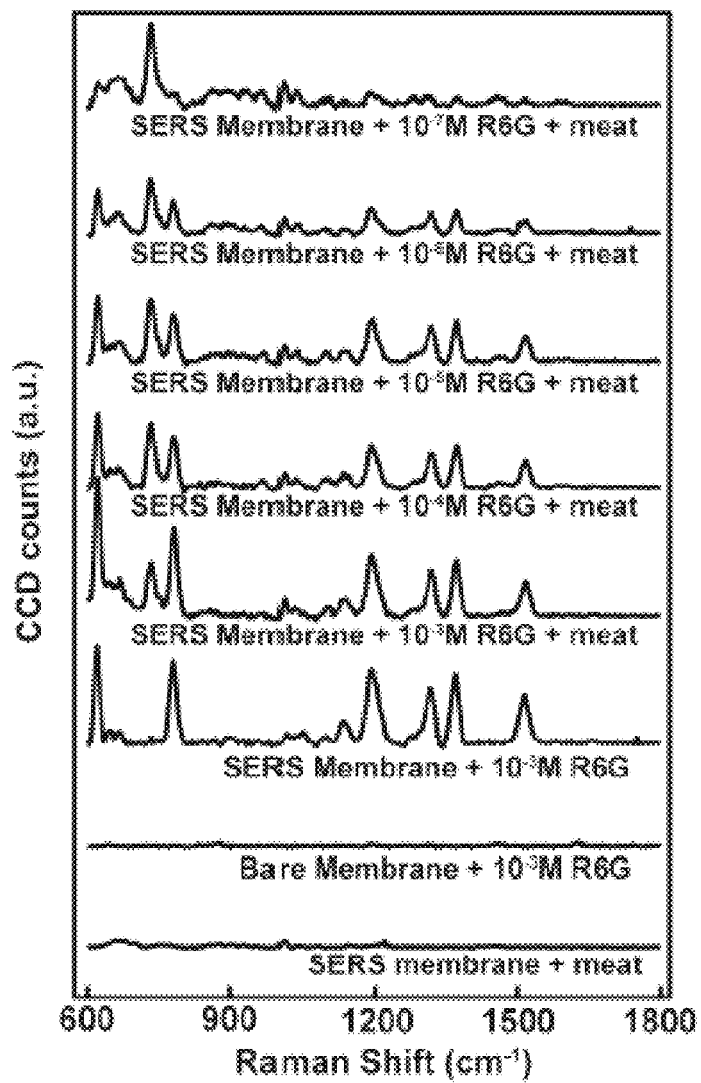

To test the SERS membranes' sensing capability, Raman spectra of different concentrations of R6G solution drop-casted on the surface of meat were acquired (FIG. 4C). The SERS spectra were acquired in situ by placing the SERS membrane on the meat under the backside laser excitation with averaged Raman signals from 100 pixels over a 25 μm$^2$ region. No distinct Raman peaks exist for the bare membrane without Au NPs, indicating that the PU membrane has a low Raman crosssection without producing interfering Raman signals. We did not observe prominent Raman peaks in control SERS measurement of "SERS membrane+meat," revealing a relatively low biomolecule concentration at plasmonic hotspots on the meat surface environment. As expected, the Raman spectra from "SERS membrane+$10^{-3}$M R6G" can show several distinct R6G peaks while no Raman peaks can show up for "bare membrane+$10^{-3}$ M R6G" due to the lack of plasmonic enhancement from micropatch arrays of Au NP aggregates. The characteristic R6G Raman peaks at 612 $cm^{-1}$, 773 $cm^{-1}$, 1126 $cm^{-1}$, 1185 $cm^{-1}$ and 1310 $cm^{-1}$ correspond to the C—C—C in-plane bending vibration, C—H out-plane bending vibration, C—H in-plane bending vibration, C—H and N—H bending vibrations, and C=C stretching vibration, respectively, while the peaks at 1362 and 1507 $cm^{-1}$ originate from the stretching vibration for C—C bonds of the xanthene ring.[44]

Figure 9A:
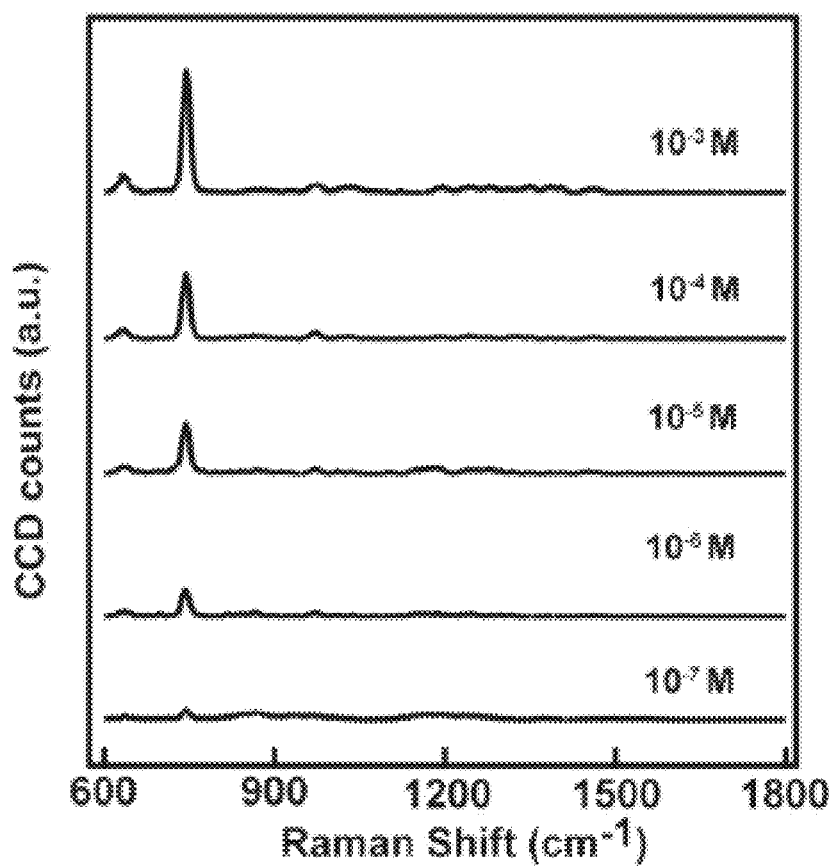
FIGS. 9A-9B demonstrate SERS detection of adenine.
Figure 9B:
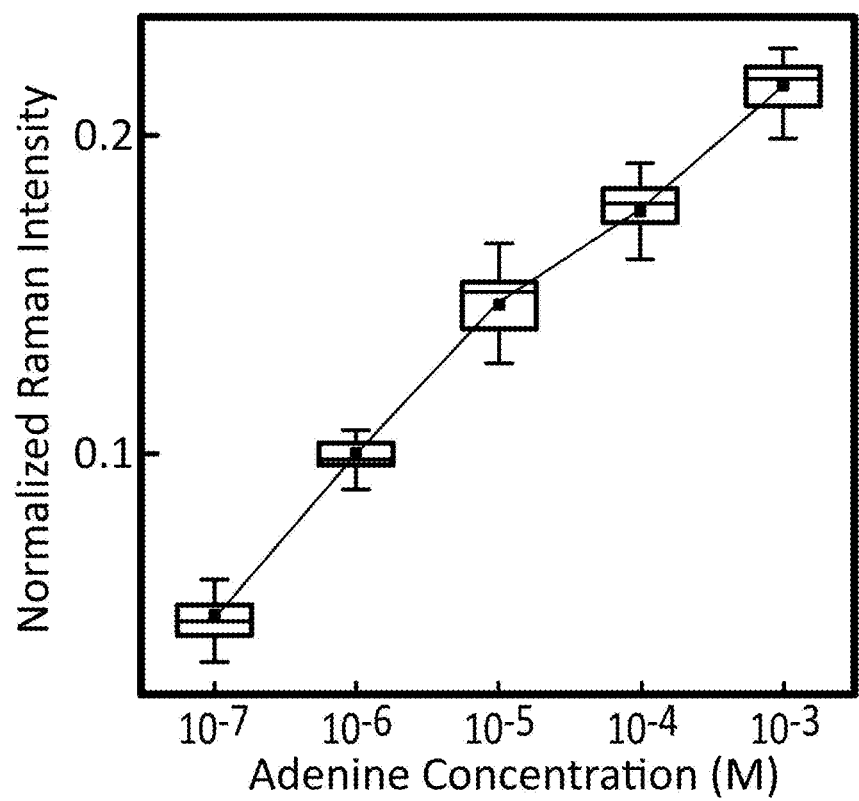

Subsequently, we conducted SERS measurements for "SERS membrane+R6G+meat" with different R6G solution concentrations added to the fresh meat covered with the SERS membrane (FIG. 4C). With R6G concentrations reduced from $10^{-3}$ M to $10^{-7}$ M, measured R6G SERS intensity keeps decreasing with a detection limit of ~$10^{-7}$ M. Compared to the spectra of "SERS membrane+meat" and "SERS membrane+$10^{-3}$ M R6G", the spectrum of "SERS membrane+$10^{-3}$ M R6G+meat" reveals an additional peak at 727 $cm^{-1}$ indicating that some biomolecules on the meat can accumulate in hotspots with increased signal intensity after adding the R6G solution. We hypothesize that the added R6G solution can affect and facilitate the biomolecule transfer from the meat surface to the SERS hotspots. Remarkably, the emerging peak at 727 $cm^{-1}$ can be attributed to the in-plane ring-breathing mode of adenine molecules on the meat. We conducted the SERS measurements of adenine at different concentrations using the Au NP micropatch arrays, and we found an adenine detection limit of ~$10^{-7}$ M for our SERS devices (FIG. 9).

As R6G concentrations reduce from $10^{-3}$ M to $10^{-7}$ M, the R6G 773 $cm^{-1}$ peak intensity decreases but the adenine 727 $cm^{-1}$ peak intensity increases in the spectra of "SERS membrane+R6G+meat" (FIG. 4C). Since the positively charged R6G molecules would electrostatically adsorb on the negatively charged citrate capped Au NPs, the increased adenine 727 $cm^{-1}$ peak intensity at lower R6G concentrations reflects that the decreased coverage of R6G in SERS hotspots can increase the adenine molecule occupation rate in the same hotspots. Previous studies on bacteria SERS measurements have reported that the 720-735 $cm^{-1}$ peak associated with the in-plane ring breathing mode of adenine is the main feature in the SERS spectra of various bacteria due to the adenine containing metabolites secreted by bacteria.[45, 48] Since most raw poultry contains bacteria, we think that the observed emerging Raman peak at 727 $cm^{-1}$ can originate from adenine containing metabolites secreted by bacteria on the meat. Therefore, the SERS membranes can also be used for on-site and rapid detection of meat freshness and spoilage.

Figure 4D:
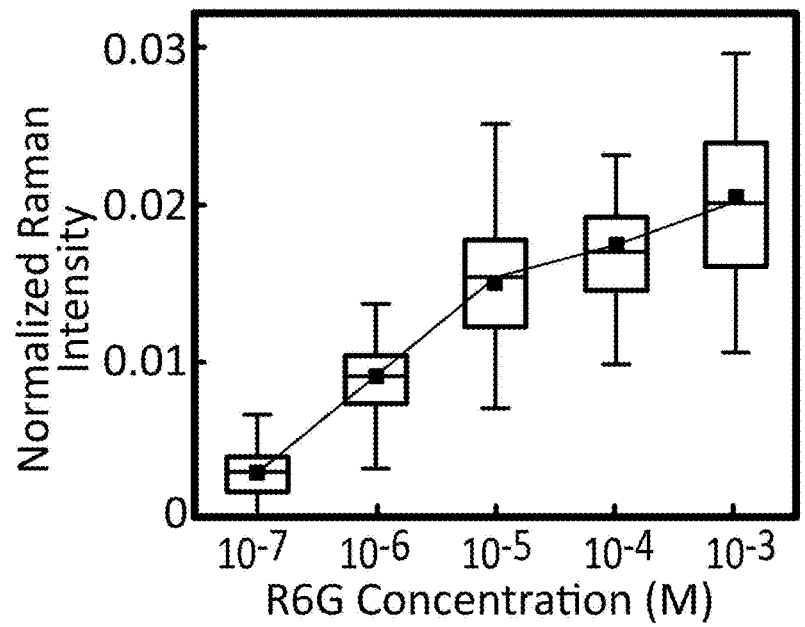
Figure 4E:
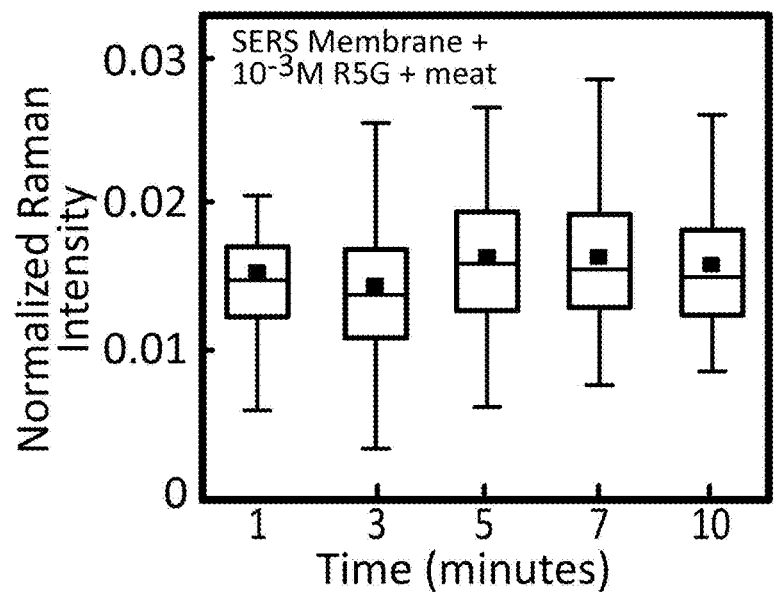

To quantitatively understand the relationship between the Raman intensity and R6G concentration, we show Raman intensity boxplots for the 1185 $cm^{-1}$ Raman peak at different R6G concentrations (FIG. 4D). FIG. 4D suggests that the Raman signal intensity increases with the R6G concentration. However, the Raman intensity begins to grow slowly after the R6G concentration exceeds $10^{-5}$ M, due to the nearly saturated surface coverage of R6G molecules at higher concentrations.[49, 51] Second, to evaluate the capability of the breathable semipermeable SERS membrane for preserving the moisture from evaporation and maintaining a stable biochemical environment at the meat surface, boxplots of Raman intensity were obtained from the 1185 $cm^{-1}$ Raman peak at different times ranging from 1 to 10 min upon applying the membrane for SERS measurements (FIG. 4E). FIG. 4E indicates that the Raman signal intensity remained relatively constant with time. Because the water vapor transport rate through breathable semipermeable wound dressings is very low to prevent dehydration of the wound,[52] the semipermeable SERS membrane can allow for stable in situ SERS measurements of R6G probe molecules with constant concentrations at the meat surface by minimizing the evaporation of analyte solutions.

Sensing Performance of SERS Textiles.

Figure 5A:
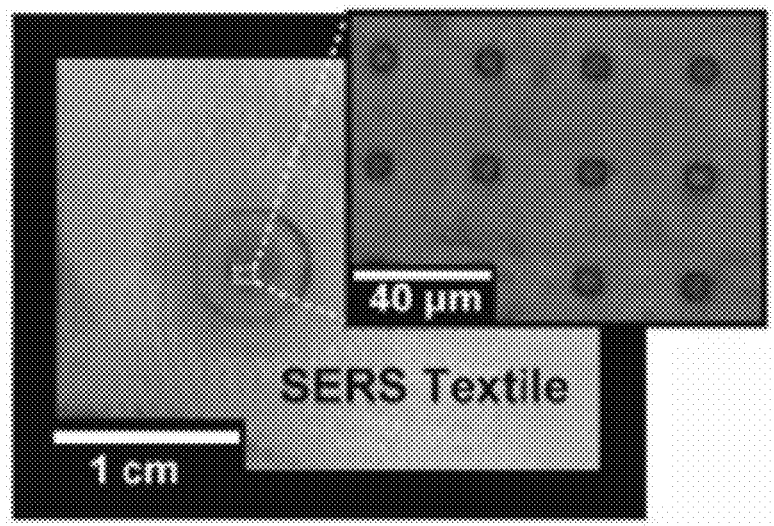
FIGS. 5A-5D depict SERS detection of solution analytes with stretchable SERS textiles.
Figure 5B:
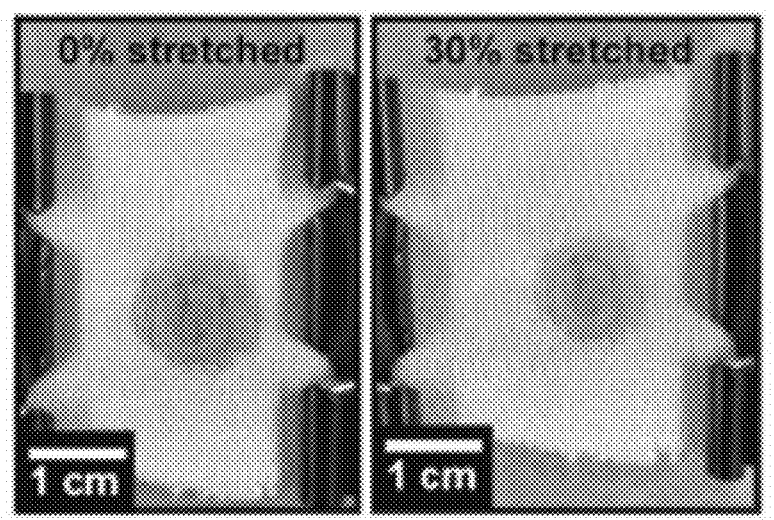
Figure 5C:
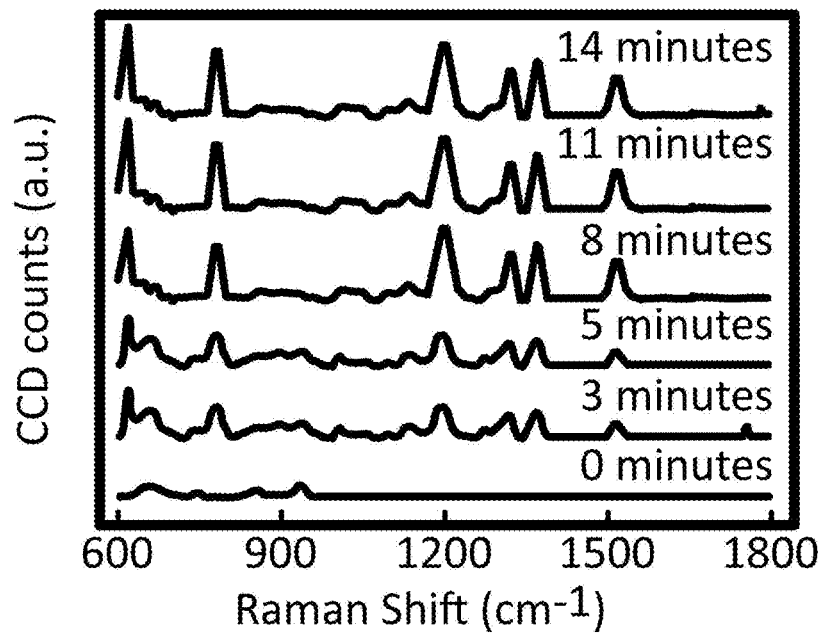
Figure 5D:
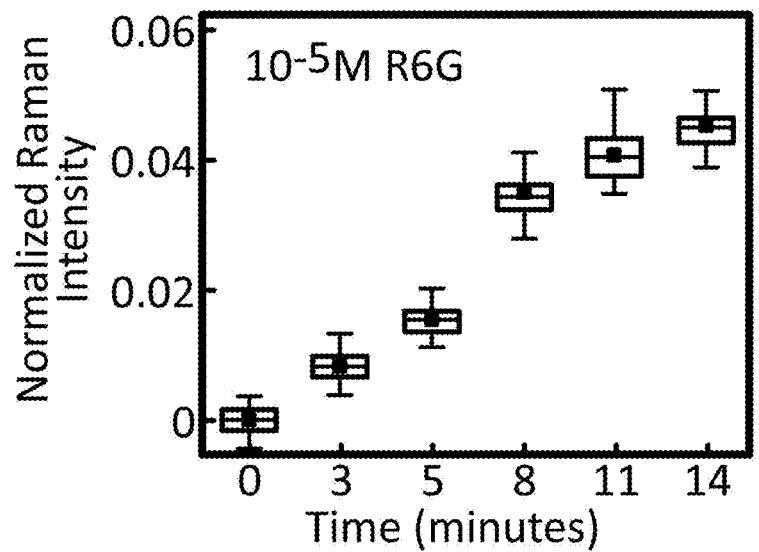

To further demonstrate the fabrication versatility using the template assisted self-assembly and micro/nanoimprinting approaches, we created the micropatch arrays of Au NP aggregates on stretchable textiles. FIG. 5A shows an optical image of the SERS textile and the corresponding optical microscope image. Nowadays, a large percentage of casual clothing is highly stretchable for easier body movement. FIG. 5B demonstrates the stretchability of the SERS textile with a stretch percentage of 30%. Cotton fabrics absorb water because of the hydrophilic nature of cotton and porous spaces in the fabric structure.[53] This tendency of fabrics to absorb water would affect how the analyte solution behaves when it is drop-casted on the SERS textile surface. To study this effect, Raman spectra of $10^{-5}$ M R6G solution drop-casted on the SERS textile surface were continuously acquired over some time. Raman spectra were obtained at t=0, 3, 5, 8, 11, and 14 min (FIG. 5C). We observed R6G Raman peaks located at 612 $cm^{-1}$, 773 $cm^{-1}$, 1126 $cm^{-1}$, 1185 $cm^{-1}$, 1310 $cm^{-1}$, 1362 and 1507 $cm^{-1}$. As t increases from 0 to 8 min, the intensity of R6G Raman peaks increases rapidly, and the Raman peak intensity saturates with a further increase of t from 8 to 14 min. To quantitatively assess this process, we examine the time-dependent boxplots of Raman intensity for the Raman peak at 1185 $cm^{-1}$ (FIG. 5D), which shows a dramatic increase of Raman intensity by a factor of 4 in the first 8 min and a prolonged increase in the next 6 min. The observed fast increase and subsequent saturation of Raman intensity are likely due to the absorbing nature of cotton textiles that the fabric can rapidly absorb R6G solution upon contact but with an exponential decrease of the absorption rate over time.[54] Due to friction between the hierarchical plasmonic arrays and the R6G solution, the R6G solution's movement velocity toward the fabric should be the least close to the surface and increase as the distance from the surface increases.[55, 56] As the fabric slowly absorbed more and more water, the remaining R6G molecules concentrated close to the SERS hotspots, causing the enhancement and subsequent stabilization of the SERS intensity. This fast fabric absorption induced drying of analyte solution can be advantageous for wearable sensing allowing rapid enrichment of analyte molecules to stabilize SERS signals for biofluid droplet samples.

Regeneration of Contaminated SERS Hotspots by Sonication or Stirring Washing.

Figure 6A:
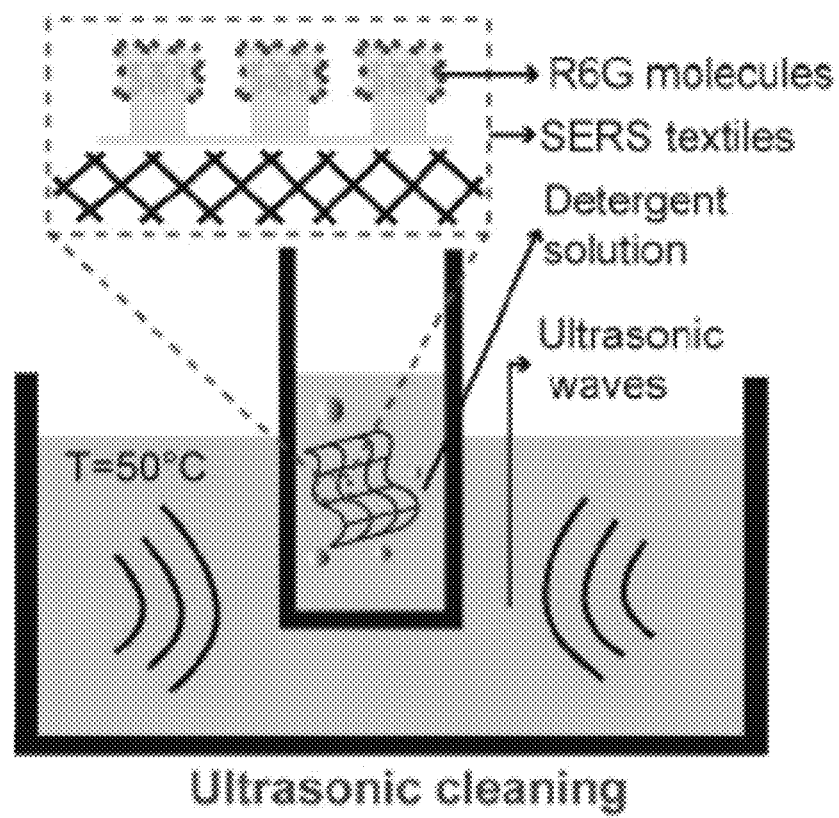
FIGS. 6A-6F depict regeneration of contaminated SERS hotspots by washing.
Figure 6B:
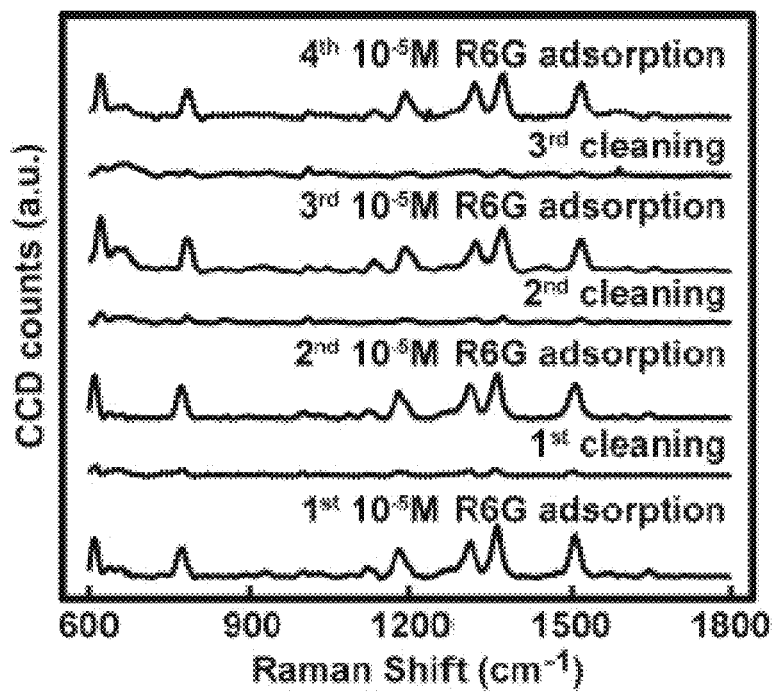
Figure 6C:
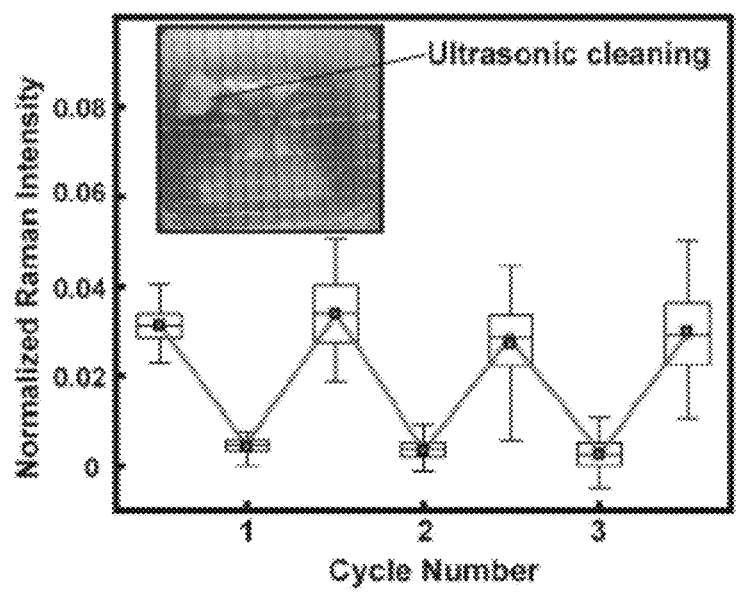

Finally, we explored the SERS textiles' reusability by regenerating contaminated SERS hotspots with simple ultrasound sonication or mechanical stirring washing process in detergent-water mixtures. FIG. 6A shows a schematic illustration of the sonication detergentwater washing process. Detergents contain surfactants, which adsorb onto R6G molecules in an oriented manner.[57] The surfactant adsorbed R6G molecules can be attached to the surface of the Au NPs by van der Waals forces, and external sources can supply the energy required to detach these R6G molecules.[57] Mechanical agitation by the ultrasonic waves can loosen R6G molecules adhered to the surface and provide a part of the energy required to remove the attached R6G molecules. Relatively high temperatures can increase water molecules' kinetic energy and release the R6G molecules from the hotspot surface. The R6G adsorption and washing cycle was repeated three times with reproducible results, demonstrating the SERS textiles' washing reusability (FIG. 6B). We observed that the ultrasonic mechanical agitation could enable effective detergent cleaning and significantly reduce R6G Raman signals from residue R6G molecules at SERS hotspots. Besides, no degradation in SERS performance was observed over three cycles, revealing the fabricated SERS device's robustness. Indeed, the strong nanoparticle-substrate adhesion by UV cured resist can prevent SERS hotspots' degradation from the mechanical agitation of ultrasonic waves (FIG. 6B). To assess the SERS performance after multiple cycles of the ultrasonic cleaning process, we obtain Raman intensity boxplots for the 1185 $cm^{-1}$ Raman peak (FIG. 6C). The Raman intensity remained relatively constant over 3 cycles with mean values of 0.031, 0.034, 0.026, and 0.031, confirming the SERS textiles' reusability with reproducible SERS performance.

Figure 6D:
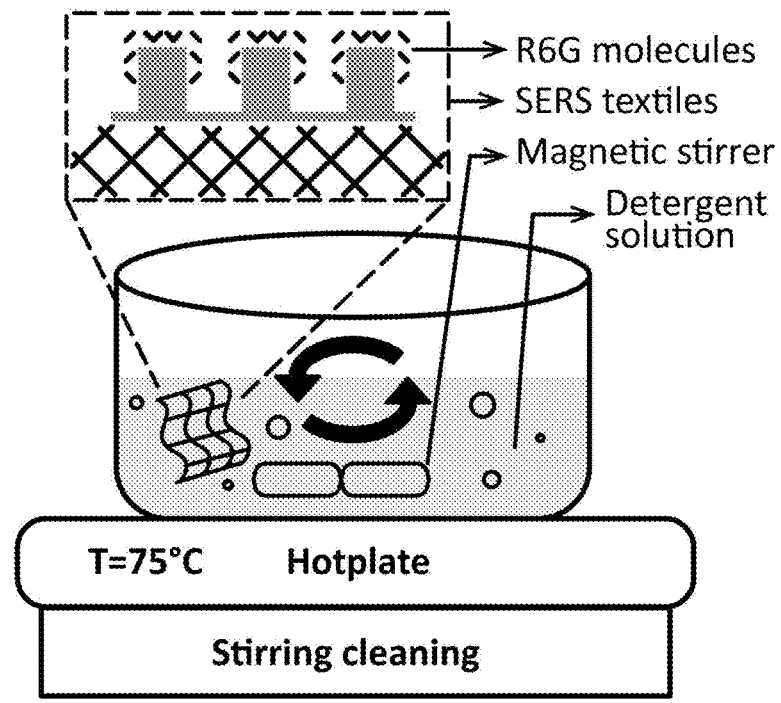
Figure 6E:
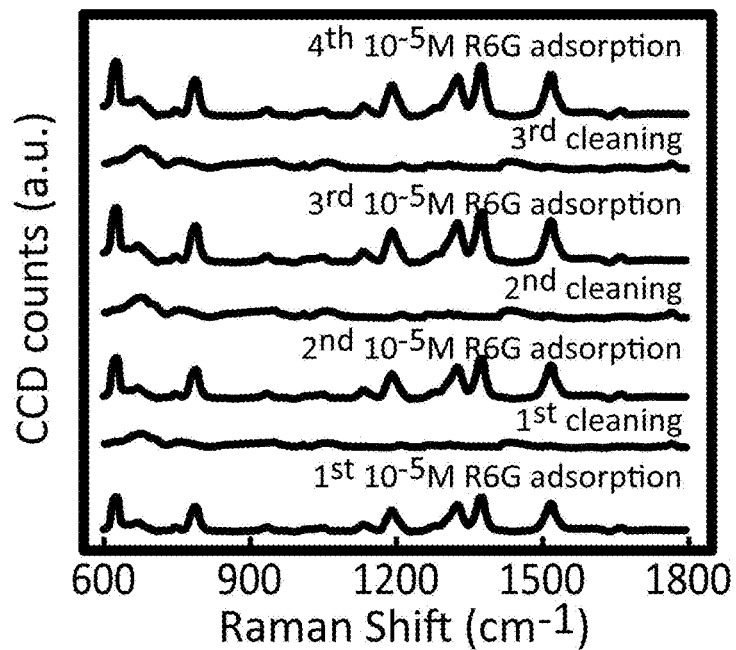
Figure 6F:
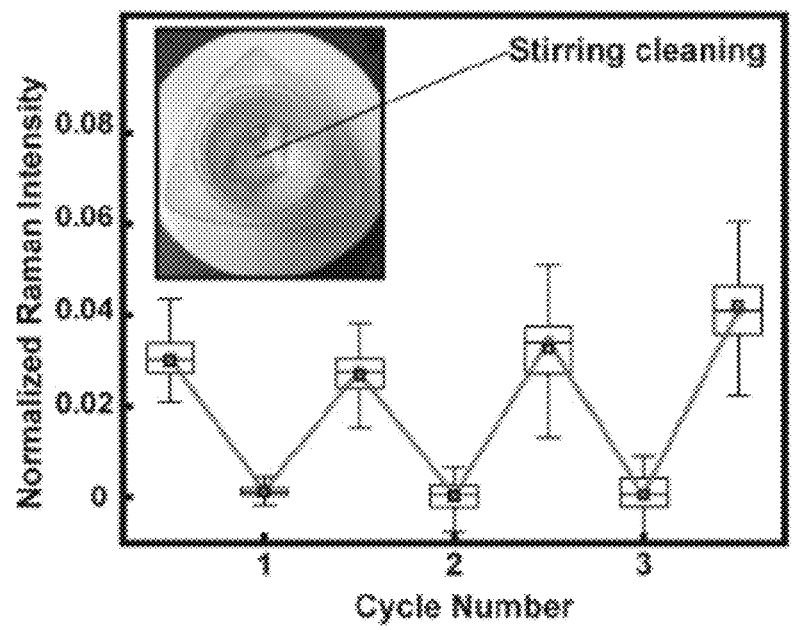

FIG. 6D shows a schematic of the mechanical stirring detergent cleaning process, where a rotating magnet stirs SERS textiles with adsorbed R6G molecules in detergent solution at 75° C. The mechanical stirring and relatively high water temperature can provide the necessary energy to release the R6G molecules from the Au NP surface. Subsequently, the detergent solution was replaced with DI water, and magnetic stirring was performed again. The rinsing process with clean water can create a strong concentration s1; radiant of detergent molecules leading to diffusiophoresis[58] and remove the remaining surfactant-adsorbed R6G molecules from the Au NP surface. The R6G adsorption and washing cycle was repeated three times with reproducible results (FIG. 6E). No R6G peaks were observed after washing, suggesting that this method successfully regenerated the hotspots by removing R6G molecules. Again, no degradation in SERS performance was observed over three cycles indicating that the SERS hotspots were not destructively perturbed by the magnetic stirring process (FIG. 6E). The Raman intensity remained relatively constant over three cycles with mean values of 0.029, 0.026, 0.033, and 0.040 to allow reusability of the SERS textiles (FIG. 6F).

Results Summary

In conclusion, we have developed washing reusable SERS membranes and textiles via scalable nanofabrication processes based on template-assisted self-assembly and micro/nanoimprinting. Compared to previously developed wearable SERS devices, our fabrication technique offers several advantages: (1) good uniformity control of the spatial distribution and intensity of SERS hotspots, (2) good manufacturing compatibility with many types of delicate membrane/fabric materials due to the mild UV micro/nanoimprinting process at room temperature, and (3) strong mechanical bonding between Au NPs and the wearable substrates via a UV-cured resist. Due to the good mechanical robustness of the UV-resist immobilized Au NP aggregates, we could regenerate contaminated SERS hotspots using user-friendly detergentwater washing processes over multiple cleaning cycles without degrading the SERS performance. Therefore, we envision that the template-assisted self-assembly and micro/nanoimprinting approaches can help create different types of wearable washing reusable SERS fabrics/membranes with advanced materials properties, including stretchability micro/nanoscaled porosity, and transparency for specific needs in different biochemical sensing applications.

REFERENCES (1) Nag, A.; Mukhopadhyay, S. C.; Kosel, J. Wearable Flexible Sensors: A Review. *IEEE Sens. J.* 2017, 17 (13), 3949-3960.

(2) Kenry; Yeo, J. C.; Lim, C. T. Emerging Flexible and Wearable Physical Sensing Platforms for Healthcare and Biomedical Applications. *Microsystems & Nanoengineering* 2016, 2 (1), 16043.

(3) Sempionatto, J. R.; Jeerapan, I.; Krishnan, S.; Wang, J. Wearable Chemical Sensors: Emerging Systems for On-Body Analytical Chemistry. *Anal. Chem.* 2020, 92 (1), 378-396.

(4) Bandodkar, A. J.; Jeang, W. J.; Ghaffari, R.; Rogers, J. A. Wearable Sensors for Biochemical Sweat Analysis. *Annu. Rev. Anal. Chem.* 2019, 12 (1), 1-22.

(5) Seshadri, D. R.; Li, R. T.; Voos, J. E.; Rowbottom,]. R.; Alfes, C. M.; Zorman, C. A.; Drummond, C. K. Wearable Sensors for Monitoring the Physiological and Biochemical Profile of the Athlete. *npj Digital Medicine* 2019, 2 (1), 72.

(6) Lee, K.; Ni, X.; Lee, J. Y.; Arafa, H.; Pe, D. J.; Xu, S.; Avila, R.; Irie, M.; Lee,]. H.; Easterlin, R. L.; Kim, D. H.; Chung, H. U.; Olabisi, O. O.; Getaneh, S.; Chung, E.; Hill, M.; Bell, J.; Jang, H.; Liu, C.; Park, J. B.; Kim, J.; Kim, S. B.; Mehta, S.; Pharr, M.; Tzavelis, A.; Reeder, J. T.; Huang, I.; Deng, Y.; Xie, Z.; Davies, C. R.; Huang, Y.; Rogers, J. A. Mechano-Acoustic Sensing of Physiological Processes and Body Motions via a Soft Wireless Device Placed at the Suprasternal Notch. *Nature Biomedical Engineering* 2020, 4 (2), 148-158.

(7) Zhao, J.; Guo, H.; Li, J.; Bandodkar, A. J.; Rogers, J. A. BodyInterfaced Chemical Sensors for Noninvasive Monitoring and Analysis of Biofluids. *Trends in Chemistry* 2019, 1 (6), 559-571.

(8) Brown, M S.; Ashley, B.; Koh, A. Wearable Technology for Chronic Wound Monitoring: Current Dressings, Advancements, and Future Prospects. *Front. Bioeng. Biotechnol.* 2018, 6, 47.

(9) Mostafalu, P.; Tamayol, A.; Rahimi, R.; Ochoa, M.; Khalilpour, A.; Kiaee, G.; Yazdi, I. K.; Bagherifard, S.; Dokmeci, M. R.; Ziaie, B.; Sonkusale, S. R.; Khademhosseini, A. Smart Bandage for Monitoring and Treatment of Chronic Wounds. *Small* 2018, 14 (33), 1703509.

(10) Yang, L.; Yi, N.; Zhu,].; Cheng, Z.; Yin, X.; Zhang, X.; Zhu, H.; Cheng, H. Novel Gas Sensing Platform based on a Stretchable Laserinduced Graphene Pattern with Self-heating Capabilities. *J. Mater. Chem. A* 2020, 8 (14), 6487-6500.

(11) Koh, A.; Kang, D.; Xue, Y.; Lee, S.; Pielak, R. M.; Kim, J.; Hwang, T.; Min, S.; Banks, A.; Bastien, P.; Manco, M. C.; Wang, L.; Ammann, K R.; Jang, K-1; Won, P.; Han, S.; Ghaffari, R.; Paik, U.; Slepian, M. J.; Balooch, G.; Huang, Y.; Rogers, J. A. A Soft, Wearable Microfluidic Device for the Capture, Storage, and Colorimetric Sensing of Sweat. *Sci. Transl. Med.* 2016, 8 (366), 366ra165.

(12) Xu, X.-Y.; Yan, B. A Fluorescent Wearable Platform for Sweat Cl- Analysis and Logic Smart-device Fabrication based on Color Adjustable Lanthanide MOFs. *J. Mater. Chem. C* 2018, 6 (7), 1863-1869.

(13) Bandodkar, A. J.; Jeerapan, I.; Wang, J. Wearable Chemical Sensors: Present Challenges and Future Prospects. *ACS Sensors* 2016, 1(5), 464-482.

(14) Heikenfeld, J.; Jajack, A.; Rogers, J.; Gutruf, P.; Tian, L.; Pan, T.; Li, R.; Khine, M.; Kim, J.; Wang, J.; Kim, J. Wearable Sensors: Modalities, Challenges, and Prospects. *Lab Chip* 2018, 18 (2), 217-248.

(15) Lee, S. P.; Ha, G.; Wright, D. E.; Ma, Y.; Sen-Gupta, E.; Haubrich, N. R.; Branche, P. C.; Li, W.; Huppert, G. L.; Johnson, M.; Mutiu, H. B.; Li, K; Sheth, N.; VWight, J. A.; Huang, Y.; Mansour, M.; Rogers, J. A.; Ghaffari, R. Highly Flexible, Wearable, and Disposable Cardiac Biosensors for Remote and Ambulatory Monitoring. *Npj Digital Medicine* 2018, 1(1), 2.

(16) Langer, J.; Jimenez de Aberasturi, D.; Aizpurua, J.; AlvarezPuebla, R. A.; Auguie, B.; Baumberg, J. J.; Bazan, G. C.; Bell, S. E. J.; Boisen, A.; Brolo, A. G.; Choo, J.; Cialla-May, D.; Deckert, V.; Fabris, L.; Faulds, K; Garcia de Abajo, F. J.; Goodacre, R.; Graham, D.; Haes, A. J.; Haynes, C. L.; Huck, C.; Itoh, T.; Kall, M.; Kneipp, J.; Kotov, N. A.; Kuang, H.; Le Ru, E. C.; Lee, H. K.; Li, J.-F.; Ling, X. Y.; Maier, S. A.; Mayerhofer, T.; Moskovits, M.; Murakoshi, K; Nam, J.-M.; Nie, S.; Ozaki, Y.; Pastoriza-Santos, I.; Perez-Juste, J.; Popp, J.; Pucci, A.; Reich, S.; Ren, B.; Schatz, G. C.; Shegai, T.; Schliicker, S.; Tay, L.-L.; Thomas, K G.; Tian, Z.-Q; Van Duyne, R. P.; Vo-Dinh, T.; Wang, Y.; Willets, K A.; Xu, C.; Xu, H.; Xu, Y.; Yamamoto, Y. S.; Zhao, B.; Liz-Marzan, L. M. Present and Future of Surface-Enhanced Raman Scattering. *ACS Nano* 2020, 14 (1), 28-117.

(17) Xu, K; Zhou, R.; Takei, K; Hong, M. Toward Flexible SurfaceEnhanced Raman Scattering (SERS) Sensors for Point-of-Care Diagnostics. *Advanced Science* 2019, 6 (16), 1900925.

(18) Mu, T.; Li, S.; Feng, H.; Zhang, C.; Wang, B.; Ma, X.; Guo, J.; Huang, B.; Zhu, L. High-sensitive Smartphonebased Raman System based on Cloud Network Architecture. *IEEE J. Sel Top. Quantum Electron.* 2019, 25 (1), 1-6.

(19) Bindesri, S. D.; Alhatab, D. S.; Brosseau, C. L. Development of an Electrochemical Surface-Enhanced Raman Spectroscopy (ECSERS) Fabric-based Plasmonic Sensor for Point-of-care Diagnostics. *Analyst* 2018, 143 (17), 4128-4135.

(20) Liu,]; Zhou,]; Tang, B.; Zeng, T.; Li, Y.; Li, J.; Ye, Y.; Wang, X. Surface Enhanced Raman Scattering (SERS) Fabrics for Trace Analysis. *Appl. Surf. Sci.* 2016, 386, 296-302.

(21) Robinson, A. M.; Zhao, L.; Shah Alam, M. Y.; Bhandari, P.; Harroun, S. G.; Dendukuri, D.; Blackburn, J.; Brosseau, C. L. The Development of "Fab-chips" as Low-cost, Sensitive Surface-Enhanced Raman Spectroscopy (SERS) Substrates for Analytical Applications. *Analyst* 2015, 140 (3), 779-785.

(22) Zong, C.; Xu, M.; Xu, L.-J.; Wei, T.; Ma, X.; Zheng, X.-S.; Hu, R.; Ren, B. Surface-Enhanced Raman Spectroscopy for Bioanalysis: Reliability and Challenges. *Chem. Rev.* 2018, 118 (10), 4946-4980.

(23) Gao, W.; Xu, J.; Cheng, C.; Qiu, S.; Jiang, S. Rapid and Highly Sensitive SERS Detection of Fungicide based on Flexible "Wash Free" Metallic Textile. *Appl. Surf. Sci.* 2020, 512, 144693

(24) Alba, M.; Pazos-Perez, N.; Vaz, B.; Formentin, P.; Tebbe, M.; Correa-Duarte, M. A.; Granero, P.; Ferre-Borrull, J.; Alvarez, R.; Pallares, J.; Fery, A.; de Lera, A. R.; Marsal, L. F.; Alvarez-Puebla, R. A. Macroscale Plasmonic Substrates for Highly Sensitive SurfaceEnhanced Raman Scattering. *Angew. Chem., Int. Ed.* 2013, 52 (25). 6459-6463.

(25) Hanske, C.; Gonzalez-Rubio, G.; Hamon, C.; Formentin, P.; Modin, E.; Chuvilin, A.; Guerrero-Martinez, A.; Marsal, L. F.; LizMarzan, L. M Large-Scale Plasmonic Pyramidal Supercrystals via Templated Self-Assembly of Monodisperse Gold Nanospheres. *J. Phys. Chem. C* 2017, 121 (20), 10899-10906.

(26) Matricardi, C.; Hanske, C.; Garcia-Pomar, J. L.; Langer, J.; Mihi, A.; Liz-Marzan, L. M. Gold Nanoparticle Plasmonic Superlattices as Surface-Enhanced Raman Spectroscopy Substrates. *ACS Nano* 2018, 12 (8), 8531-8539,

(27) Hamon, C.; Novikov, S.; Scarabelli, L.; Basabe-Desmonts, L.; Liz-Marzan, L. M. Hierarchical Self-Assembly of Gold Nanoparticles into Patterned Plasmonic Nanostructures. *ACS Nano* 2014, 8 (10), 10694-10703.

(28) Hamon, C.; Postic, M.; Mazari, E.; Bizien, T.; Dupuis, C.; Even-Hernandez, P.; Jimenez, A.; Courbin, L.; Gosse, C.; Artzner, F.; Marchi-Artzner, V. Three-Dimensional Self-Assembling of Gold Nanorods with Controlled Macroscopic Shape and Local Smectic B Order. *ACS Nano* 2012, 6 (5), 4137-4146.

(29) Zhou, X.; Zhou, Y.; Ku, J. C.; Zhang, C.; Mirkin, C. A. Capillary Force-Driven, Large-Area Alignment of Multisegmented Nanowires. *ACS Nano* 2014, 8 (2), 1511-1516.

(30) Zhou, Y.; Zhou, X.; Park, D. J.; Torabi, K.; Brown, K. A.; Jones, M. R.; Zhang, C.; Schatz, G. C.; Mirkin, C. A. Shape-Selective Deposition and Assembly of Anisotropic Nanoparticles. *Nano Lett.* 2014, 14 (4), 2157-2161.

(31) Alvarez-Puebla, R. A.; Agarwal, A.; Manna, P.; Khanal, B. P.; Aldeanueva-Potel, P.; Carb6-Argibay, E.; Pazos-Perez, N.; Vigderman, L.; Zubarev, E. R.; Kotov, N. A.; Liz-Marzan, L. M. Gold Nanorods 3D-supercrystals as Surface Enhanced Raman Scattering Spectroscopy Substrates for the Rapid Detection of Scrambled Prions. *Proc. Natl. Acad. Sci. U.S.A.* 2011, 108 (20), 8157.

(32) Jeong,]. W.; Amob, M. M. P.; Baek, K.-M.; Lee, S. Y.; Shih, W. C.; Jung, Y. S. 3D Cross-Point Plasmonic Nanoarchitectures Containing Dense and Regular Hot Spots for Surface-Enhanced Raman Spectroscopy Analysis. *Adv. Mater.* 2016, 28 (39), 8695-8704.

(33) Rycenga, M.; Camargo, P. H. C.; Xia, Y. Templateassisted Selfassembly: A Versatile Approach to Complex Micro- and Nanostructures. *Soft Matter* 2009, 5 (6), 1129-1136.

(34) Zhong, L.-B.; Yin,]; Zheng, Y.-M.; Liu, Q; Cheng, X.-X.; Luo, F.-H. Self-Assembly of Au Nanoparticles on PMMA Template as Flexible, Transparent, and Highly Active SERS Substrates. *Anal. Chem.* 2014, 86 (13), 6262-6267.

(35) Song, J.; Nam, W.; Zhou, W. Scalable High-Performance Nanolaminated SERS Substrates Based on Multistack Vertically Oriented Plasmonic Nanogaps. *Advanced Materials Technologies* 2019, 4 (5), 1800689.

(36) Kandjani, A. E.; Mohammdatheri, M.; Thakkar, A.; Bhargava, S. K.; Bansal, V. Zinc Oxide/Silver Nanoarrays as Reusable SERS Substrates with Controllable 'hotspots' for Highly Reproducible Molecular Sensing. *J. Colloid Interface Sci.* 2014, 436, 251-25 7.

(37) Zhang, C. X.; Liu, L.; Jun Yin, H.; Fang, H.; Mei Zhao, Y.; Jian Bi, C.; Jun Xu, H. Recyclable Surface-Enhanced Raman Scattering Template Based on Nanoporous Gold Film/Si Nanowire Arrays. *Appl. Phys. Lett.* 2014, 105 (1). 011905.

(38) Mahurin, S. M.; John, J.; Sepaniak, M. J.; Dai, S. A Reusable Surface-Enhanced Raman Scattering (SERS) Substrate Prepared by Atomic Layer Deposition of Alumina on a Multi-layer Gold and Silver Film. *Appl. Spectrosc.* 2011, 65 (4), 417-422.

(39) Poirier, G. E.; Pylant, E. D. The Self-Assembly Mechanism of Alkanethiols on Au(III). *Science* 1996, 272 (5265), 1145.

(40) Joo, T. H.; Kim, M. S.; Kim, K Surface-Enhanced Raman Scattering of Benzenethiol in Silver Sol. *J. Raman Spectrosc.* 1987, 18 (1), 57-60.

(41) Im, H.; Bantz, K. C.; Lee, S. H.; Johnson, T. W.; Haynes, C. L.; Oh, S.-H. Self-Assembled Plasmonic Nanoring Cavity Arrays for SERS and LSPR Biosensing. *Adv. Mater.* 2013, 25 (19), 2678-2685.

(42) Nanopartz Spherical Gold Nanoparticles Certificate of Analysis.

(43) Mampallil, D. Some Physics inside Drying Droplets. *Resonance* 2014, 19 (2), 123-134.

(44) Yong, Q; Sheng, M. Size-dependent SERS Detection of R6G by Silver Nanoparticles Immersion-plated on Silicon Nanoporous Pillar Array DJ. *Appl. Surf. Sci.* 2012, 258 (15), 5881-5885.

(45) Madzharova, F.; Heiner, Z.; Giihlke, M.; Kneipp, J. Surface Enhanced Hyper-Raman Spectra of Adenine, Guanine, Cytosine, Thymine, and Uracil. *J. Phys. Chem. C* 2016, 120 (28), 15415-15423.

(46) Premasir, W. R.; Gebregziabher, Y.; Ziegler, L. D. On the Difference between Surface-Enhanced Raman Scattering (SERS) Spectra of Cell Growth Media and Whole Bacterial Cells. *Appl. Spectrosc.* 2011, 65 (5), 493-499.

(47) Kubryk, P.; Niessner, R.; Ivleva, N. P. The Origin of the Band at around 730 cm-1 in the SERS Spectra of Bacteria: A Stable Isotope Approach. *Analyst* 2016, 141(10), 2874-2878.

(48) Premasiri, W. R.; Lee, J. C.; Sauer-Budge, A.; Theberge, R.; Costello, C. E.; Ziegler, L. D. The Biochemical Origins of the surface Enhanced Raman Spectra of Bacteria: A Metabolomics Profiling by SERS. *Anal. Bioanal. Chem.* 2016, 408 (17), 4631-4647.

(49) Bell, S. E.; Sirimuthu, N. M. Qyantitative Surface-Enhanced Raman Spectroscopy. *Chem. Soc. Rev.* 2008, 37 (5), 1012-1024.

(50) Fang, H.; Zhang, C. X.; Liu, L.; Zhao, Y. M.; Xu, H. J. Recyclable A Three-dimensional Ag Nanoparticle-decorated TiO2 Nanorod Arrays for Surface-Enhanced Raman Scattering. *Biosens Bioelectron.* 2015, 64, 434-441.

(51) Guo, J.; Luo, Y.; Yang, C.; Kong, L. In Situ Surface-Enhanced Raman Scattering Sensing with Soft and Flexible Polymer Optical Fiber Probes. *Opt. Lett.* 2018, 43 (21), 5443-5446.

(52) Xu, R.; Xia, H.; He, W.; Li, Z.; Zhao, J.; Liu, B.; Wang, Y.; Lei, Q; Kong, Y.; Bai, Y. Controlled Water Vapor Transmission Rate Promotes Wound-healing via Wound Re-epithelialization and Contraction Enhancement. *Sci. Rep.* 2016, 6, 24596.

(53) Karahan, M.; Eren, R. Experimental Investigation of the Effect of Fabric Parameters on Static Water Absorption in Terry Fabrics. *Fibres and Textiles in Eastern Europe* 2006, 14 (2), 59.

(54) Cruz, J.; Leitao, A.; Silveira, D.; Pichandi, S.; Pinto, M.; Fangueiro, R. Study of Moisture Absorption Characteristics of Cotton Terry Towel Fabrics. *Procedia Eng.* 2017, 200, 389-398.

(55) Koplik, J.; Banavar, J. R.; Wllemsen, J. F. Molecular Dynamics of Fluid Flow at Solid Surfaces. *Phys. Fluids* A 1989, 1 (5), 781-794.

(56) Singh, H.; Myong, R. S. Critical Review of Fluid Flow Physics at Micro- to Nano-scale Porous Media Applications in the Energy Sector. *Adv. Mater. Sci. Eng.* 2018, 2018, 9565240.

(57) Bajpai, D. Laundry Detergents: An Overview. *J. Oleo Sci.* 2007, 56 (7), 327-340.

(58) Shin, S.; Warren, P. B.; Stone, H. A. Cleaning by Surfactant Gradients: Particulate Removal from Porous Materials and the Significance of Rinsing in Laundry Detergency. *Phys. Rev. Appl.* 2018, 9 (3), 034012.

(59) Wei, H.; Leng, W.; Song, J.; Willner, M. R.; Marr, L. C.; Zhou, W.; Vikesland, P. J. Improved Quantitative SERS Enabled by Surface Plasmon Enhanced Elastic Light Scattering. *Anal. Chem.* 2018, 90 (5), 3227-3237.

We claim:

1. A method of making a membrane or textile comprising a mechanically robust surface-enhanced Raman spectroscopy (SERS) substrate, the method comprising:
   a. adhesively bonding an etchable polymer-micropatch array to a substrate, the micropatch array comprising a plurality of shaped etchable polymer micron-scale pillars formed concurrently with the bonding, each of the micron-scale pillars in the plurality of micron-scale pillars comprising a plurality of plasmonic nanoparticles dispersed within the etchable polymer; and
   b. etching a portion of the polymer matrix to expose at least a portion of the plasmonic nanoparticles at or near a surface of the micron-scale pillars.

2. The method according to claim 1, further comprising prior to the adhesive bonding step, forming the micropatch array by a method comprising:
   i. contacting a colloidal solution with a template, the template comprising a plurality of micron-scale wells, each well configured to define the shape of a shaped micron-scale pillar, the colloidal solution comprising the plasmonic nanoparticles dispersed in a solvent;
   ii. evaporating the solvent to self-assemble the plasmonic nanoparticles into the micron-scale wells.

3. The method according to claim 2, wherein the plasmonic nanoparticles comprise a capping agent such as a citrate, and wherein the citrate assists the plasmonic nanoparticles to self-assemble via evaporation induced self-assembly.

4. The method according to claim 3, further comprising applying a curable polymer to the template to form the micropatch array having the plasmonic nanoparticles dispersed in the polymer matrix.

5. The method according to claim 2, wherein the colloidal solution further comprises a polymeric precursor, and wherein the solvent evaporation caused the polymeric precursor to polymerize to leave the plasmonic nanoparticles dispersed in the polymer.

6. The method according to claim 1, wherein the substrate comprises a membrane.

7. The method according to claim 6, wherein the membrane comprises a porous polymeric membrane or a non-porous polymeric membrane.

8. The method according to claim 1, wherein the substrate comprises a textile.

9. The method according to claim 8, wherein the textile comprises a woven textile, a non-woven textile, or a knitted textile.

10. The method according to claim 1, wherein the micron-scale pillars comprise diameters, heights, or both from about 5 microns to about 50 microns or from about 10 microns to about 30 microns.

11. The method according to claim 1, wherein the plasmonic nanoparticles comprise Au nanoparticles, Ag nanoparticles, Ru nanoparticles, Rh nanoparticles, Pd nanoparticles, or Pt nanoparticles.

12. The method of claim 1 wherein the plasmonic nanoparticles are self-assembled.

13. A membrane or textile comprising:
  a. a substrate;
  b. an etchable polymer-micropatch array adhesively bonded to the substrate, the micropatch array comprising a plurality of shaped etchable polymer-micron-scale pillars, each of the micron-scale pillars in the plurality of micron-scale pillars comprising a plurality of plasmonic nanoparticles dispersed within the etchable polymer and having at least a portion of the plasmonic nanoparticles exposed at or near a surface of the micron-scale pillars.

14. The membrane or textile according to claim 13, wherein the substrate comprises a membrane.

15. The membrane or textile according to claim 14, wherein the membrane comprises a porous polymeric membrane or a non-porous polymeric membrane.

16. The membrane or textile according to claim 13, wherein the substrate comprises a textile.

17. The membrane or textile according to claim 16, wherein the textile comprises a woven textile, a non-woven textile, or a knitted textile.

18. The membrane or textile according claim 13, wherein the micron-scale pillars comprise diameters, heights, or both from about 5 microns to about 50 microns or from about 10 microns to about 30 microns.

19. The membrane or textile according to claim 13, wherein the plasmonic nanoparticles comprise Au nanoparticles, Ag nanoparticles, Ru nanoparticles, Rh nanoparticles, Pd nanoparticles, or Pt nanoparticles.

20. The membrane or textile of claim 13 wherein the plasmonic nanoparticles are self-assembled.

* * * * *